United States Patent
Zhang et al.

(10) Patent No.: US 12,149,921 B2
(45) Date of Patent: Nov. 19, 2024

(54) OPERATOR NETWORK SWITCHING METHOD AND ELECTRONIC DEVICE

(71) Applicant: HUAWEI TECHNOLOGIES CO., LTD., Guangdong (CN)

(72) Inventors: Xin Zhang, Shenzhen (CN); Hao Song, Shenzhen (CN); Tao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 371 days.

(21) Appl. No.: 17/631,546

(22) PCT Filed: Jul. 31, 2020

(86) PCT No.: PCT/CN2020/106095
§ 371 (c)(1),
(2) Date: Jan. 31, 2022

(87) PCT Pub. No.: WO2021/018273
PCT Pub. Date: Feb. 4, 2021

(65) Prior Publication Data
US 2022/0279390 A1    Sep. 1, 2022

(30) Foreign Application Priority Data

Aug. 1, 2019  (CN) .......................... 201910707875.8
Oct. 31, 2019 (CN) .......................... 201911063088.0

(51) Int. Cl.
*H04W 8/18*      (2009.01)
*H04W 36/00*     (2009.01)
(Continued)

(52) U.S. Cl.
CPC ....... *H04W 8/183* (2013.01); *H04W 36/0022* (2013.01); *H04W 36/322* (2023.05); *H04W 36/365* (2013.01); *H04W 84/042* (2013.01)

(58) Field of Classification Search
CPC . H04W 36/0022; H04W 8/183; H04W 36/32; H04W 36/365; H04W 84/042;
(Continued)

(56) References Cited

U.S. PATENT DOCUMENTS 8,260,694 B1 * 9/2012 Lauer .................... G06Q 20/14
                                                    705/26.1
2003/0228011 A1 * 12/2003 Gibson ............. H04M 3/42161
                                                    379/201.01
(Continued)

FOREIGN PATENT DOCUMENTS

CN        105101319 A    11/2015
CN        102457834 B     1/2016
(Continued)

OTHER PUBLICATIONS

Extended European Search Report issued in EP20848192.9, dated Jul. 25, 2022, 11 pages.

(Continued)

*Primary Examiner* — Michael Y Mapa

(57) ABSTRACT

A method and an electronic device for operator network switching are provided and relate to the field of terminal technologies. A currently activated profile in an electronic device is a first profile. Specifically, the method includes: accessing, by the electronic device, a first operator network based on the first profile; detecting a second operation after disconnecting a connection to the first operator network in response to a first operation; searching for a network based on stored profiles in response to the second operation, to obtain network search results corresponding to the stored profiles; activating a second profile based on the network search results corresponding to the stored profiles; and
(Continued)

accessing a second operator network based on the second profile. In this way, operator network switching is implemented.

16 Claims, 18 Drawing Sheets

(51) Int. Cl.
  *H04W 36/32* (2009.01)
  *H04W 36/36* (2009.01)
  *H04W 84/04* (2009.01)

(58) Field of Classification Search
  CPC ... H04W 36/322; H04W 48/18; H04W 48/16; H04W 88/06
  USPC ......... 370/331; 455/432.1–435.3, 456.1–457
  See application file for complete search history.

(56) References Cited

U.S. PATENT DOCUMENTS

| | | | |
|---|---|---|---|
| 2014/0018069 A1* | 1/2014 | Willey | H04W 48/18 455/434 |
| 2014/0295807 A1* | 10/2014 | Li | H04M 3/42195 455/414.1 |
| 2015/0304506 A1 | 10/2015 | Zhu et al. | |
| 2016/0156607 A1* | 6/2016 | Kim | H04W 4/50 726/7 |
| 2016/0246611 A1 | 8/2016 | Li et al. | |
| 2018/0288606 A1 | 10/2018 | Gao | |
| 2021/0281998 A1* | 9/2021 | Kim | H04W 8/183 |

FOREIGN PATENT DOCUMENTS

| | | |
|---|---|---|
| CN | 105451214 A | 3/2016 |
| CN | 105704705 A | 6/2016 |
| CN | 105828317 A | 8/2016 |
| CN | 105873143 A | 8/2016 |
| CN | 105979569 A | 9/2016 |
| CN | 106131816 A | 11/2016 |
| CN | 106255036 A | 12/2016 |
| CN | 104221347 B | 3/2017 |
| CN | 107484213 A | 12/2017 |
| CN | 107548054 A | 1/2018 |
| CN | 206948301 U | 1/2018 |
| CN | 107959951 A | 4/2018 |
| CN | 108012259 A | 5/2018 |
| CN | 108184256 A | 6/2018 |
| CN | 109068313 A | 12/2018 |
| CN | 109068314 A | 12/2018 |
| CN | 109343944 A | 2/2019 |
| CN | 110072263 A | 7/2019 |
| EP | 2448301 A1 | 5/2012 |
| EP | 3512258 A1 | 7/2019 |
| JP | 2004297784 A | 10/2004 |
| JP | 2010183376 A | 8/2010 |
| JP | 2016001926 A | 1/2016 |
| JP | 2017195455 A | 10/2017 |
| KR | 20180013242 A | 2/2018 |
| WO | 2014032570 A1 | 3/2014 |
| WO | 2018000641 A1 | 1/2018 |
| WO | 2018021897 A1 | 2/2018 |
| WO | 2018107723 A1 | 6/2018 |

OTHER PUBLICATIONS

Office Action issued in JP2022-506503, dated Mar. 27, 2023 with English translation, 9 pages.
Vodafone et al., "Introduction of support for NB-Iot", SA WG2 Meeting #112, Nov. 16-20, 2015, Anaheim, USA, S2-154104, total: 341 pages.
Chunhuan Dai et al.,"Design and Implementation of Embedded UICC Remote Management Platform", Mar. 9, 2016, total: 163 pages.
Jian Yang et al.,"Analysis of Consumer Electronics eSIM Technology and Discussion of Operators Strategies", Dec. 15, 2017, total:15 pages.
Office Action issued in CN201911063088.0, dated Jul. 2, 2021, 6 pages.

* cited by examiner

OPERATOR NETWORK SWITCHING METHOD AND ELECTRONIC DEVICE

CROSS-REFERENCE TO RELATED APPLICATIONS

This application is a national stage of International Application No. PCT/CN2020/106095, filed on Jul. 31, 2020, which claims priority to Chinese Patent Application No. 201911063088.0, filed on Oct. 31, 2019 and Chinese Patent Application No. 201910707875.8, filed on Aug. 1, 2019. All of the aforementioned applications are hereby incorporated by reference in their entireties.

TECHNICAL FIELD

This application relates to the field of terminal technologies, and in particular, to an operator network switching method and an electronic device.

BACKGROUND

Currently, with development of terminal technologies, to improve device security, facilitate user operations, and the like, an embedded universal integrated circuit card (eUICC) technology is introduced. An eUICC is formed by embedding a universal integrated circuit card (UICC) into an electronic device through packaging, soldering, or the like. Therefore, it is inconvenient to insert the eUICC or remove the eUICC, and the eUICC cannot be randomly replaced like the UICC, to avoid a risk of being stolen or misappropriated. The eUICC may also be referred to as an embedded subscriber identification module (eSIM). According to an eSIM technology, the electronic device may usually store a plurality of profiles. The profile is used to access an operator network, and can be stored in the electronic device based on a user requirement. Specifically, the profile may include parameters such as an integrate circuit card identity (IC-CID), an international mobile subscriber identity (IMSI), a key identifier (KI), an authentication algorithm, a network configuration-related parameter, a personal identification number (PIN), a PIN unlocking key (PUK), and a telephone number. Therefore, when the electronic device stores a plurality of profiles, the electronic device may implement flexible switching between operator networks by switching between the plurality of profiles. However, in the conventional technology, when the electronic device implements switching between the operator networks by switching between the plurality of profiles, a user's manual operation is required, and user experience is poor.

SUMMARY

This application provides an operator network switching method and an electronic device, so that when the electronic device stores two or more profiles, when a network connection is restored after the network connection is disconnected, the electronic device can automatically switch an activated profile to access a corresponding operator network, so as to help improve user experience.

According to a first aspect, an embodiment of this application provides an operator network switching method, performed by an electronic device. The electronic device stores a first profile and a second profile, and the first profile is a currently activated profile. The electronic device accesses a first operator network based on the first profile. If a first operation is detected, the electronic device disconnects a connection to the first operator network in response to the first operation, where the first operation is used to disconnect a network connection. After disconnecting a connection to the first operator network, the electronic device detects a second operation, where the second operation is used to restore a network connection. The electronic device searches for a network based on the first profile and the second profile in response to the second operation, to obtain a network search result corresponding to the first profile and a network search result corresponding to the second profile. Then, the electronic device activates the second profile based on the network search result corresponding to the first profile and the network search result corresponding to the second profile. Finally, the electronic device accesses a second operator network based on the second profile. In this way, operator network switching is implemented.

In this embodiment, after disconnecting a connection to a network, the electronic device can search for a network based on at least two profiles when detecting an operation used to restore a network connection. Then, a profile that needs to be activated is determined based on a network search result, so that an operator network accessed by the electronic device can meet a user requirement. In addition, a corresponding profile is activated without a user's manual operation, to help improve user experience.

In an example embodiment, the electronic device sends a request to subscribe to a call transfer service to the first operator network, where the request to subscribe to the call transfer service is used to transfer an incoming call for a first telephone number to a second telephone number, the first telephone number is a telephone number included in the first profile, and the second telephone number is a telephone number included in the second profile. Then, when receiving a first response for subscribing to the call transfer service, the electronic device notifies the user that an incoming call for the first telephone number is to be transferred to the second telephone number, where the first response is used to indicate that the call transfer service is successfully subscribed to, and the first response is returned for the request to subscribe to the call transfer service.

According to the foregoing solution, the electronic device can send the request to subscribe to the call transfer service to the first operator network, so that the incoming call for the first telephone number is transferred to the second telephone number. Therefore, after accessing the second operator network, the electronic device does not miss an incoming call for the first telephone number.

In an example embodiment, the electronic device sends, to the first operator network, a request to stop charging for a service package corresponding to the first profile, and after receiving a second response for stopping charging for the service package corresponding to the first profile, notifies the user that the first operator network stops charging for the service package corresponding to the first profile. The second response is used to indicate that stopping of charging for the service package corresponding to the first profile fails, and the second response is returned for the request to stop charging for the service package corresponding to the first profile.

According to the foregoing technical solution, the electronic device can send, to the first operator network, the request to stop charging for the service package corresponding to the first profile, so that charging for the service package corresponding to the first profile can be stopped when the electronic device uses a service provided by the second operator network, to help reduce user costs. In addition, after the first operator network stops charging for the service package corresponding to the first profile, the electronic device may further inform the user that charging for the service package corresponding to the first profile is stopped. This helps the user to learn of a current consumption status of the service package.

In an example embodiment, when a validity period of a service package corresponding to the second profile is longer than or equal to a first duration, the electronic device sends, to the first operator network, the request to stop charging for the service package corresponding to the first profile. When the validity period corresponding to the second profile is relatively short, the electronic device may activate the first profile again. In the foregoing solution, the electronic device sends, to the first operator network, the request to stop charging for the service package corresponding to the first profile only when the validity period corresponding to the second profile is relatively long. This helps further reduce user costs.

In an example embodiment, the electronic device notifies the user of the service package corresponding to the second profile. In this way, the user can learn of the service package that is subscribed to after the electronic device accesses the second operator network.

In an example embodiment, the electronic device deactivates the first profile.

In an example embodiment, the electronic device searches for a network based on the first profile, the second profile, and a radio frequency capability of the electronic device, to obtain the network search result corresponding to the first profile and the network search result corresponding to the second profile. This helps improve reliability of the network search results.

In an example embodiment, the electronic device obtains a first geographic location in response to the second operation, where the first geographic location is used to indicate a current geographic location of the user. The electronic device determines whether a distance between the first geographic location and a second geographic location is greater than or equal to a first threshold, where the second geographic location is obtained before the electronic device disconnects a connection to the first operator network in response to the first operation. When the distance between the first geographic location and the second geographic location is greater than or equal to the first threshold, the electronic device searches for a network based on the first profile and the second profile, to obtain the network search result corresponding to the first profile and the network search result corresponding to the second profile. When the distance between the first geographic location and the second geographic location is greater than or equal to the first threshold, the electronic device is triggered to search for a network based on the first profile and the second profile, and switches an activated profile to the second profile, so that an operator network accessed by the electronic device at the first geographic location can meet a user requirement.

In an example embodiment, when the distance between the first geographic location and the second geographic location is less than the first threshold and greater than or equal to a second threshold, the electronic device searches for a network based on the first profile, to obtain a first public land mobile network PLMN, where the first threshold is greater than the second threshold. The electronic device further determines whether the first PLMN is the same as a second PLMN, where the second PLMN is a PLMN used when the electronic device accesses the first operator network. When the first PLMN is different from the second PLMN, the electronic device searches for a network based on the first profile and the second profile, to obtain the network search result corresponding to the first profile and the network search result corresponding to the second profile. When the distance between the first geographic location and the second geographic location is less than the first threshold and greater than or equal to the second threshold, and when the first PLMN is different from the second PLMN, the electronic device can be triggered to search for a network based on the first profile and the second profile, and switches an activated profile to the second profile, so that an operator network accessed by the electronic device at the first geographic location can meet a user requirement.

In an example embodiment, the electronic device searches for a network based on the first profile in response to the second operation, to obtain a first PLMN, and determines whether the first PLMN is the same as a second PLMN, where the second PLMN is a PLMN used when the electronic device accesses the first operator network. When the first PLMN is different from the second PLMN, the electronic device searches for a network based on the first profile and the second profile, to obtain the network search result corresponding to the first profile and the network search result corresponding to the second profile. When the first PLMN is different from the second PLMN, the electronic device can be triggered to search for a network based on the first profile and the second profile, and switches an activated profile to the second profile, so that an operator network accessed by the electronic device can meet a user requirement.

In an example embodiment, the electronic device activates the second profile based on the network search result corresponding to the first profile, the network search result corresponding to the second profile, service package information corresponding to the first profile, and service package information corresponding to the second profile; and/or the electronic device activates the second profile based on the network search result corresponding to the first profile, the network search result corresponding to the second profile, and a preconfigured network blacklist.

In the foregoing solution, when determining to activate the second profile, the electronic device may further refer to the service package information and/or the network blacklist in addition to the network search results, to help improve accuracy of the activated second profile, to further meet a requirement of the user.

In an example embodiment, the first operation is an operation of enabling an airplane mode, and the second operation is an operation of disabling the airplane mode; or the first operation is a power-off operation, and the second operation is a power-on operation.

According to a second aspect, an embodiment of this application provides an operator network switching method, performed by an electronic device. The electronic device stores a first profile and a second profile, and the first profile is a currently activated profile. The electronic device accesses a first operator network based on the first profile, and detects a first operation, where the first operation is used to disconnect a network connection. The electronic device disconnects a connection to the first operator network in response to the first operation. The electronic device detects a second operation after disconnecting a connection to the first operator network, where the second operation is used to restore a network connection. The electronic device obtains a first geographic location in response to the second operation, where the first geographic location is used to indicate a current geographic location of a user. When a distance between the first geographic location and a second geographic location is greater than or equal to a first threshold, the electronic device activates the second profile, and accesses a second operator network based on the second profile, where the second geographic location is obtained before the electronic device disconnects a connection to the first operator network in response to the first operation.

In this embodiment, when detecting the operation used to restore a network connection after the electronic device disconnects a connection to a network, the electronic device can activate the second profile when the distance between the first geographic location and the second geographic location is greater than or equal to the first threshold, so that an operator network accessed by the electronic device at the first geographic location can meet a user requirement. In addition, a corresponding profile is activated without the user's manual operation, to help improve user experience.

In an example embodiment, the electronic device further stores a third profile. When the distance between the first geographic location and the second geographic location is greater than or equal to the first threshold, the electronic device searches for a network based on the second profile and the third profile, to obtain a network search result corresponding to the second profile and a network search result corresponding to the third profile, determines, based on the network search result corresponding to the second profile and the network search result corresponding to the third profile, to activate the second profile and the second profile in the third profile, and then activates the second profile. This helps further improve accuracy of an activated profile, to meet a user requirement.

According to a third aspect, an embodiment of this application provides an electronic device, including a processor and a memory. The processor is coupled to the memory, the memory is configured to store program instructions, and the processor is configured to read the program instructions stored in the memory, to implement the method according to any one of the foregoing aspects or the example embodiments of the foregoing aspects in the embodiments of this application.

According to a fourth aspect, an embodiment of this application provides a computer-readable storage medium. The computer-readable storage medium stores program instructions, and when the program instructions are run on an electronic device, the electronic device is enabled to perform the method according to any one of the foregoing aspects or the example embodiments of the foregoing aspects in the embodiments of this application.

According to a fifth aspect, an embodiment of this application provides a computer program product. When the computer program product is run on an electronic device, the electronic device is enabled to perform the method according to any one of the foregoing aspects or the possible designs of the foregoing aspects in the embodiments of this application.

According to a sixth aspect, an embodiment of this application provides a chip. The chip is coupled to a memory in an electronic device, and controls the electronic device to perform the method according to any one of the foregoing aspects or the example embodiments of the foregoing aspects in the embodiments of this application.

In addition, for technical effects brought by the third aspect to the fifth aspect, refer to the related descriptions in the foregoing methods in the designs. Details are not described herein again.

It should be noted that "coupling" in the embodiments of this application indicates a direct combination or an indirect combination between two components.

DESCRIPTION OF EMBODIMENTS

Figure 1A:
FIG. 1A to FIG. 1D are schematic diagrams of interfaces according to an embodiment of this application.

It should be understood that, unless otherwise indicated in this application, "/" means "or". For example, A/B may represent A or B. In this application, the term "and/or" describes only an association relationship for describing associated objects and represents that three relationships may exist. For example, A and/or B may represent the following three cases: Only A exists, both A and B exist, and only B exists. "At least one" means one or more, and "a plurality of" means two or more. For example, at least one of a, b, or c may represent seven cases a, b, c, a and b, a and c, b and c, and a, b and c.

In this application, the term "example", "in some embodiments", "in some other embodiments", or the like is used to represent an example, an illustration, or a description. Any embodiment or design scheme described as an "example" in this application should not be explained as being more preferential or having more advantages than another embodiment or design scheme. Exactly, the word "example" is used to present a concept in a specific manner.

In addition, terms such as "first" and "second" in this application are used only for distinguishing. The terms cannot be understood as indicating or implying relative importance or implicitly indicating a quantity of indicated technical features. The terms also cannot be understood as indicating or implying a sequence.

The term "exceeding" in this application may be understood as being greater than or not less than. For example, if a distance between a geographic location A and a geographic location B exceeds a threshold 1, it may be understood that the distance between the geographic location A and the geographic location B is greater than or equal to the threshold 1, or the distance between the geographic location A and the geographic location B is greater than the threshold 1. The term "not exceeding" in this application may be understood as being less than or not greater than. For example, if a distance between a geographic location A and a geographic location B does not exceed a threshold 2, it may be understood that the distance between the geographic location A and the geographic location B is less than or equal to the threshold 2, or the distance between the geographic location A and the geographic location B is less than the threshold 2.

It should be understood that a profile in the embodiments of this application is a profile used to access an operator network. For example, the profile may include an ICCID, an IMSI, a KI, an authentication algorithm, a network configuration-related parameter, a PIN, a PUK, and a telephone number. An electronic device supporting an eSIM technology may store one or more profiles. The profile stored in the electronic device may be delivered by an operator or a third party (for example, a card vendor) to the electronic device after a user subscribes to a service package. For example, after the user subscribes to a Tencent King card service package of China Unicom, China Unicom or a third party delivers a profile used to access a network of China Unicom to the electronic device. For another example, after the user subscribes to a 5G service package of the UK operator EE, the UK operator EE or a third party delivers a profile used to access a network of the UK operator EE to the electronic device. It should be noted that in the embodiments of this application, the user may subscribe to service packages of one or more operators based on a requirement of the user.

For a user who frequently travels abroad or travels on a business trip, the electronic device usually stores two or more profiles. For example, the user subscribes to a service package of an operator in a country in which the user resides, and subscribes to a service package of an operator in a country in which the user is in a business trip or on a journey, so that when the user is in the country in which the user resides, the electronic device may access an operator network in the country in which the user resides, to provide a service for the user; and when the user arrives in the country in which the user is in a business trip or on a journey, the electronic device may access an operator network in the country in which the user is in a business trip or on a journey, to provide a service for the user. In this way, the user can access a network when arriving in the country in which the user is in a business trip or on a journey, user communication is not affected, and this further helps save user costs.

However, the electronic device accesses an operator network based on an activated profile in the stored profiles, and provides services such as Internet access and voice communication for the user. Currently, the activated profile in the electronic device is not changed without a manual operation. Therefore, if the user arrives in the country in which the user is in a business trip or on a journey from the country in which the user resides, the user needs to manually operate the electronic device to activate a corresponding profile, so as to access a corresponding operator network, and implement operator network switching on the electronic device. For example, the user may activate a profile by performing an operation in an eSIM management interface.

Figure 1B:
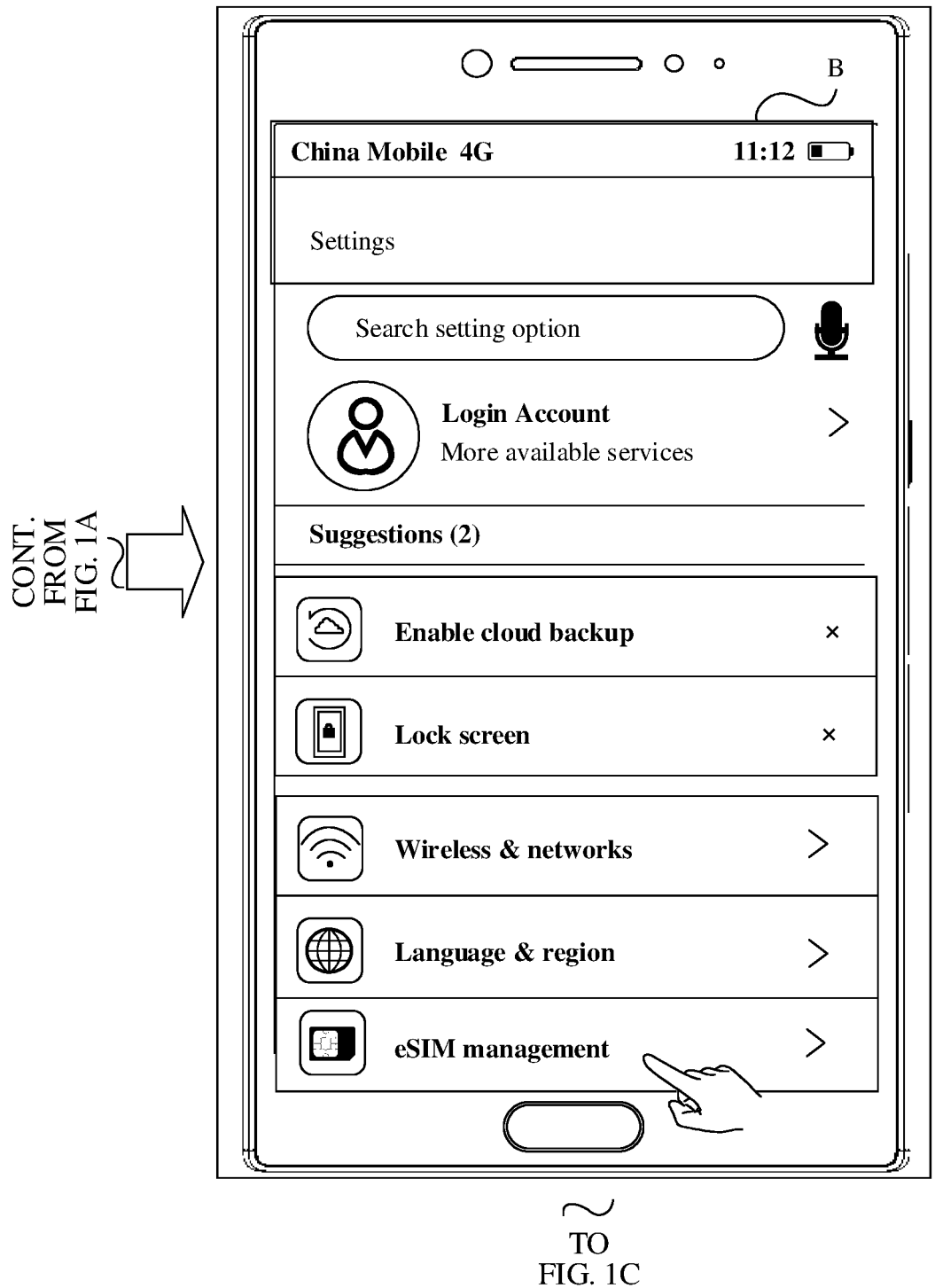
Figure 1C:
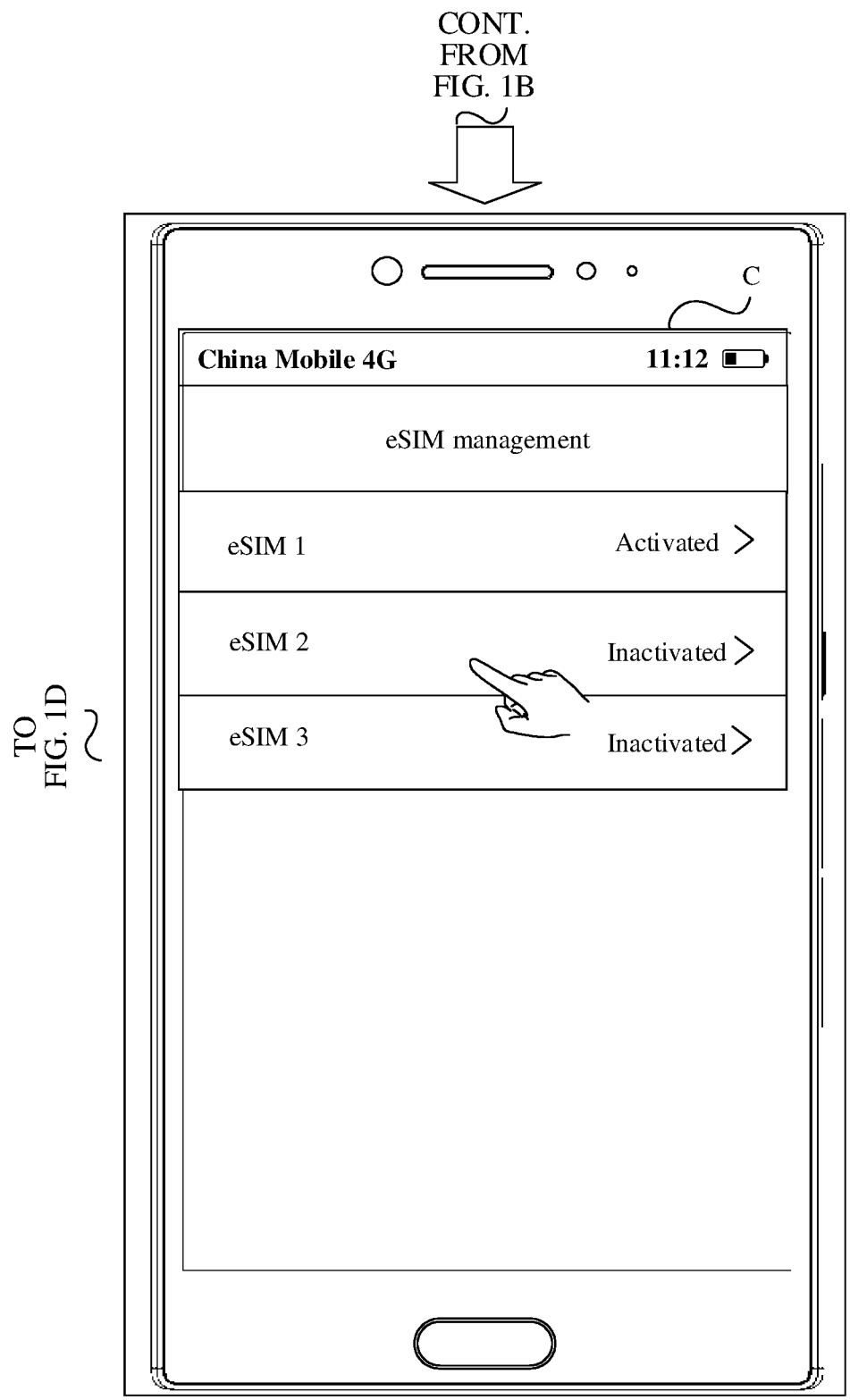
Figure 1D:
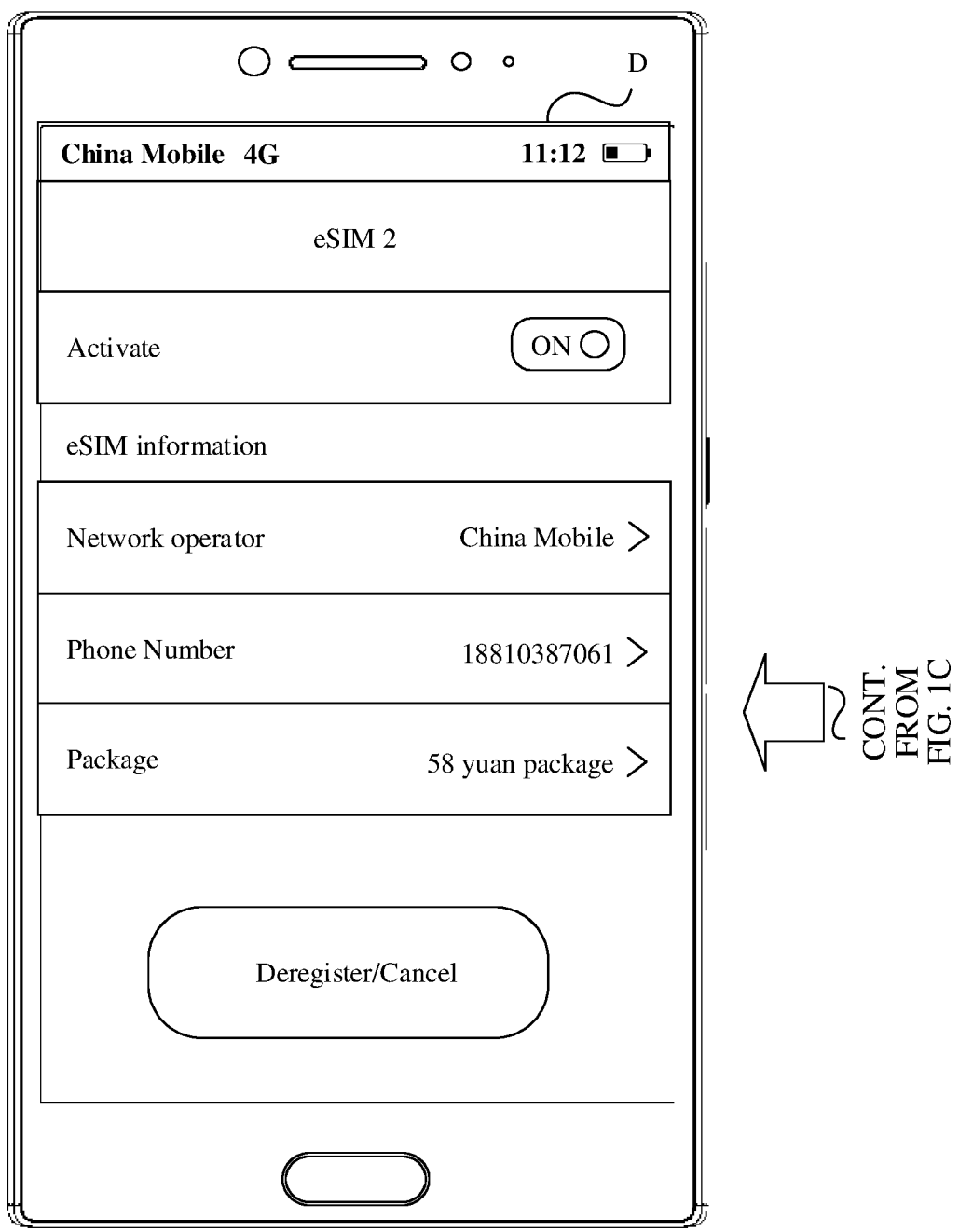

For example, when the electronic device stores a profile 1, a profile 2, and a profile 3, the eSIM management interface may be shown in an interface C in FIG. 1C. The interface C includes an eSIM 1 option, an eSIM 2 option, and an eSIM 3 option. The eSIM 1 option is used to indicate the profile 1, the eSIM 2 option is used to indicate the profile 2, and the eSIM 3 option is used to indicate the profile 3. For example, the profile 1 indicated by the eSIM 1 option is a currently activated profile. If the user wants to activate the profile 2, the user needs to tap the eSIM 2 option, and the electronic device displays an interface related to the eSIM 2 on a display in response to tapping the eSIM 2 option by the user. The interface related to the eSIM 2 may be shown in an interface D in FIG. 1D. The user may set a virtual button used to control activation of a profile to ON, so that the electronic device activates the profile 2 in response to the foregoing operation. Further, when the electronic device supports access to only one operator network, when the profile 2 is activated, the electronic device may automatically stop activating the profile 1. Alternatively, the user may first perform an operation on the eSIM 1 option to stop activating the profile 1 or deactivate the profile 1, and then activate the profile 2. When the electronic device supports access to two or more operator networks, the electronic device may activate both the profile 1 and the profile 2. After activating the profile 2, the electronic device may access a corresponding operator network based on the profile 2, to provide a service for the user.

The user may tap a setting icon in an interface A in FIG. 1A, so that the electronic device displays a system setting interface. For example, the system setting interface may be shown in an interface B in FIG. 1B. The user may tap an eSIM management option, so that the electronic device displays the eSIM management interface C. Alternatively, the user may use a voice instruction, a shortcut gesture operation, or the like to enable the electronic device to display the eSIM management interface, so that the user may activate or stop activating a corresponding profile based on a requirement of the user.

Therefore, an existing manner of manually activating a profile to implement operator network switching is complex and user experience is poor. Particularly, when a plurality of profiles are stored in the electronic device, the user further needs to determine a profile that is more appropriate to be activated. In addition, an activated profile determined by the user based on experience or knowledge of the user may not be a most appropriate profile for the user. In view of this, the embodiments of this application provide an operator network switching method, so that after the electronic device is powered on or an airplane mode is disabled, the electronic device can search for a network based on two or more stored profiles, then automatically select a profile based on a network search result, and activate the profile. In this way, the electronic device can automatically implement operator network switching, and this helps improve user experience.

The following describes the electronic device, and the embodiments for using such an electronic device. The electronic device in the embodiments of this application may be a tablet computer, a mobile phone, a vehicle-mounted device, an augmented reality (AR)/virtual reality (VR) device, a laptop computer, an ultra-mobile personal computer (UMPC), a netbook, a personal digital assistant (PDA), a wearable device, a vehicle-mounted terminal, a smart home device, and the like. In addition, the electronic device in the embodiments of this application may alternatively be an animal tracking and positioning apparatus, or the like.

Figure 2:
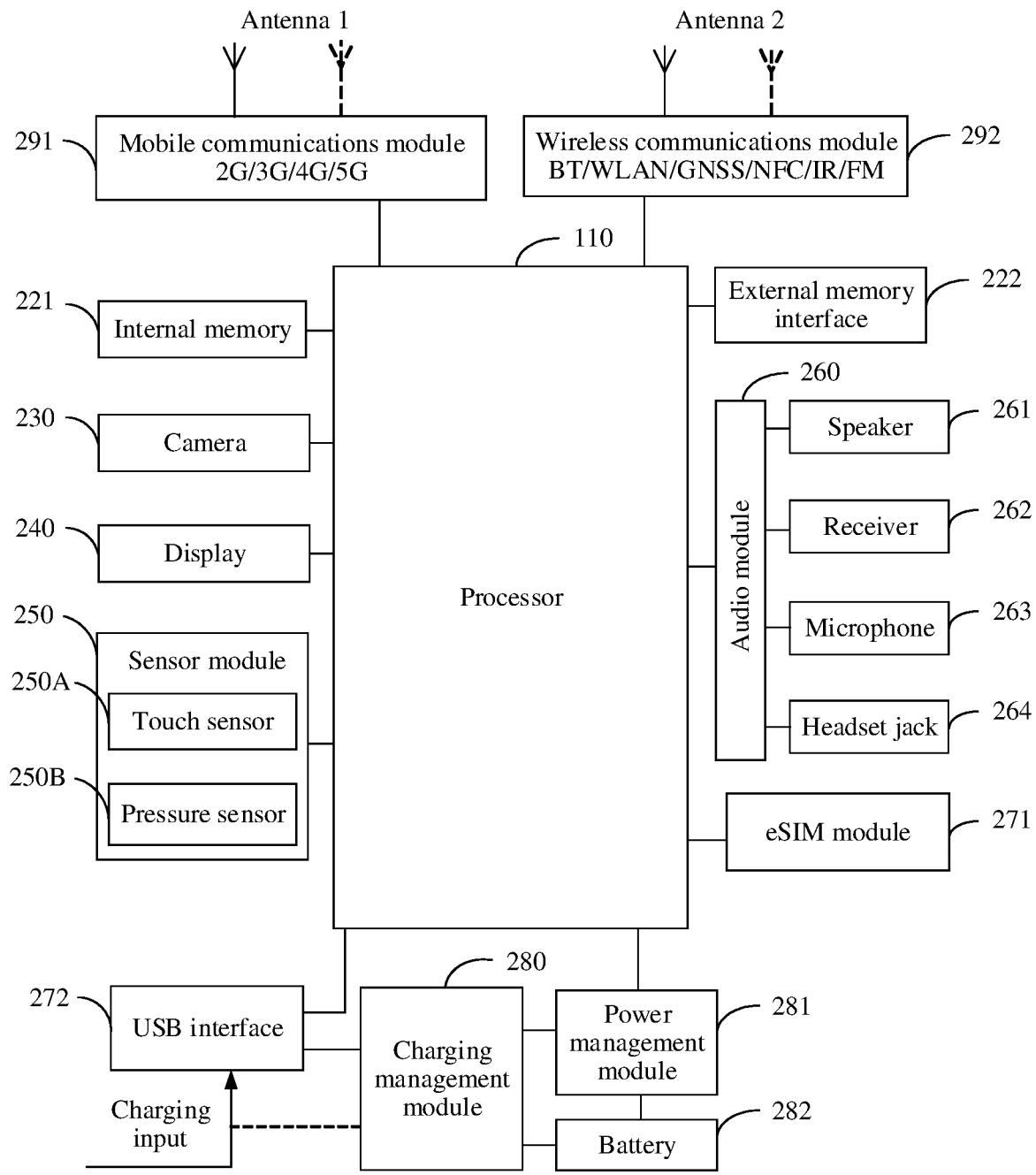
FIG. 2 is a schematic diagram of a hardware structure of an electronic device according to an embodiment of this application.

For example, FIG. 2 is a schematic diagram of a hardware structure of the electronic device according to an embodiment of this application. As shown in FIG. 2, the electronic device includes a processor 210, an internal memory 221, an external memory interface 222, a camera 230, a display 240, a sensor module 250, an audio module 260, a speaker 261, a receiver 262, a microphone 263, a headset jack 264, an eSIM module 271, a universal serial bus (USB) interface 272, a charging management module 280, a power management module 281, a battery 282, a mobile communications module 291, and a wireless communications module 292. In addition, in some other embodiments, the electronic device may further include a motor, an indicator, buttons, and the like.

It should be understood that the hardware structure shown in FIG. 2 is only an example. The electronic device in the embodiments of this application may have more or fewer components than the electronic device shown in the figure, two or more components may be combined, or there may be a different component configuration. Various components shown in the figure may be implemented in hardware, software, or a combination of hardware and software that includes one or more signal processing and/or application-specific integrated circuits.

The processor 210 may include one or more processing units. For example, the processor 210 may include an application processor (AP), a modem, a graphics processing unit (GPU), an image signal processor (ISP), a video codec, a digital signal processor (DSP), a baseband processor, and/or a neural-network processing unit (NPU). In specific implementation, different processing units may be independent components, or may be integrated into one or more components.

In some embodiments, a cache may be further disposed in the processor 210, and is configured to store a program and data. It should be noted that the program in the embodiments of this application may also be referred to as a program instruction, a computer program, a code instruction, or the like. This is not limited in embodiments of the present disclosure. For example, the cache in the processor 210 may be a cache memory. The cache may be configured to store a program and/or data that has been used, generated, or cyclically used by the processor 210. If the processor 210 needs to use the program and/or the data, the processor may directly invoke the program or the data from the cache. This helps reduce time used by the processor 210 to obtain a program or data, to improve system efficiency.

The internal memory 221 may be configured to store a program and/or data. In some embodiments, the internal memory 221 includes a program storage area and a data storage area. The program storage area may be configured to store an operating system (for example, an operating system such as Android or iOS), a program required by at least one function (for example, a network switching function or a communications function), and the like. The data storage area may be configured to store data (for example, a profile, a network signal strength, a network standard, and a network identifier blacklist) created, obtained, and/or preset in a use process of the electronic device. For example, the processor 210 may invoke the program and/or data stored in the internal memory 221, so that the electronic device performs a corresponding method, to implement one or more functions. For example, the processor 210 invokes some programs and/or data in the internal memory, so that the electronic device performs the operator network switching method provided in the embodiments of this application, to implement a function of automatically switching the operator network without a user's manual operation, and help improve user experience. The internal memory 221 may be a high-speed random access memory, a non-volatile memory, and/or the like. For example, the non-volatile memory may include at least one of one or more disk storage devices, a flash memory device, and/or a universal flash storage (UFS).

The external memory interface 222 may be configured to connect to an external memory card (for example, a micro SD card), to extend a storage capability of the electronic device. The external memory card communicates with the processor 210 through the external memory interface 222, to implement a data storage function. For example, the electronic device may store content such as an image, music, a video, or a document in the external memory card through the external memory interface 222.

The camera 230 may be configured to capture dynamic and static images and the like. Usually, the camera 230 includes a lens and an image sensor. An object is projected onto the image sensor by using an optical image generated by the lens, and then the optical image is converted into an electrical signal for subsequent processing. For example, the image sensor may be a charge coupled device (CCD) or a complementary metal-oxide-semiconductor (CMOS) photoelectric transistor. The image sensor converts an optical signal into an electrical signal, and then transmits the electrical signal to the ISP, to convert the electrical signal into a digital image signal. It should be noted that in the embodiments of this application, the electronic device may include one or more cameras 230. This is not limited in embodiments of the present disclosure. For example, the electronic device includes five cameras 230, for example, three rear-facing cameras and two front-facing cameras. For another example, the electronic device includes three cameras 230, for example, two rear-facing cameras and one front-facing camera.

The display 240 may include a display panel. The user may enable different user interfaces to be displayed on the display 240 based on a requirement of the user, to meet the requirement of the user. Specifically, the display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, quantum dot light emitting diodes (QLED), or the like. For example, the electronic device may implement a display function by using the GPU, the display 240, the application processor, and the like. It should be noted that in the embodiments of this application, the electronic device may include one or more displays 240. This is not limited in embodiments of the present disclosure.

The sensor module 250 may include one or more sensors, for example, a touch sensor 250A and a pressure sensor 250B. In some other embodiments, the sensor module 250 may further include one or more of a gyroscope, an acceleration sensor, a fingerprint sensor, an ambient optical sensor, a distance sensor, an optical proximity sensor, a bone conduction sensor, a temperature sensor, a positioning sensor (for example, a global positioning system (GPS) sensor), and the like. This is not limited in embodiments of the present disclosure.

The touch sensor 250A may also be referred to as a "touch panel". The touch sensor 250A may be disposed on the display 240. When the touch sensor 250A is disposed on the display 240, the touch sensor 250A and the display 240 constitute a touchscreen, which may be also referred to as a "touch screen". The touch sensor 250A is configured to detect a touch operation on or near the touch sensor 250A. The touch sensor 250A may transfer the detected touch operation to the application processor, to determine a type of a touch event. The electronic device may provide a visual output and the like related to the touch operation by using the display 240. For example, the electronic device may perform interface switching in response to detecting the touch operation performed on or near the touch sensor 250A, and display a switched user interface on the display 240. In some other embodiments, the touch sensor 250A may also be disposed on a surface of the electronic device in a position different from that of the display 240.

The pressure sensor 250B is configured to sense a pressure signal, and may convert the pressure signal into an electrical signal. For example, the pressure sensor 250B may be disposed on the display 240. Touch operations that are performed at a same touch location but have different touch operation intensity may correspond to different operation instructions.

The electronic device may implement audio functions such as an audio play function, a recording function, and a voice wakeup function by using the audio module 260, the speaker 261, the receiver 262, the microphone 263, the headset jack 264, the application processor, and the like.

The audio module 260 may be configured to perform digital-to-analog conversion and/or analog-to-digital conversion on audio data, and may be further configured to encode and/or decode the audio data. For example, the audio module 260 may be disposed in the processor 210, or some function modules of the audio module 260 are disposed in the processor 210.

The speaker 261, also referred to as a "loudspeaker", is configured to convert audio data into sound and play the sound. For example, the electronic device may be used to listen to music, answer a hands-free call, or send a voice prompt by using the speaker 261.

The receiver 262, also referred to as an "earpiece", is configured to convert audio data into sound and play the sound. For example, when a call is answered by using the electronic device, the receiver 262 may be put close to a human ear to answer the call.

The microphone 263, also referred to as "mike" or "mic", is configured to collect sound (for example, ambient sound, including sound made by a human being and sound made by a device) and convert the sound into audio electrical data. When making a call or sending a voice, the user may make a sound by approaching the microphone 263 through the mouth, and the microphone 263 collects the sound made by the user. It should be noted that at least one microphone 263 may be disposed on the electronic device. For example, two microphones 263 are disposed on the electronic device, to collect a sound signal and implement a noise reduction function. For another example, three, four, or more microphones 263 may alternatively be disposed on the electronic device, to collect a sound signal, implement noise reduction, and identify a sound source or implement a directional recording function and the like.

The headset jack 264 is configured to connect to a wired headset. The headset jack 264 may be the USB interface 270, a 3.5 mm open mobile terminal platform (OMTP) standard interface, a Cellular Telecommunications Industry Association of the USA (CTIA) standard interface, or the like.

The eSIM module 271 is embedded in the electronic device, and cannot be separated from the electronic device. Specifically, the electronic device accesses an operator network by using the eSIM module 271, to implement functions such as conversation, data communication, and Internet access. For example, the eSIM module 271 may support a Global System for Mobile Communications Association (GSMA) remote SIM provisioning (RSP) communications protocol, and support profile downloading, installation, activation, deactivation, deletion, and the like. Therefore, the electronic device implements flexible switching between different operator networks by activating different profiles. For example, the eSIM module 271 may obtain a plurality of profiles based on a user requirement. The plurality of profiles may include profiles used to access a same operator network, or may include profiles used to access different operator networks. This is not limited in embodiments of the present disclosure. In some embodiments, the eSIM module 271 may further include a cache. The eSIM module 271 may store a profile obtained from an operator or a third party in the cache, or store a profile obtained from an operator or a third party in the internal memory 221. For example, the electronic device stores a profile 1 and a profile 2. The profile 1 is obtained by the electronic device from a first operator network by using the eSIM module 271, and the profile 2 is obtained by the electronic device from a second operator network by using the eSIM module 271. For example, the first operator network is a network of China Unicom, and the second operator network is a network of China Mobile. When the profile 1 is activated but the profile 2 is not activated, the electronic device accesses the network of China Unicom based on the profile 1.

In some other embodiments, the eSIM module 271 may store a maximum of N profiles. Different profiles in the N profiles may be used to access a same operator network, or different profiles may be used to access different operator networks. This is not limited in embodiments of the present disclosure. For example, a value of N may be a positive integer greater than or equal to 2, for example, 2, 3, or 5, and the value of N may be preset in the electronic device based on an actual situation.

The USB interface 272 is an interface that conforms to a USB standard specification, and may be specifically a mini USB interface, a micro USB interface, a USB Type-C interface, or the like. The USB interface 272 may be configured to connect to a charger to charge the electronic device, or may be configured to transmit data between the electronic device and a peripheral device, or may be used to connect to a headset for playing audio by using the headset. For example, the USB interface 272 may be the headset jack 264, and the USB interface 272 may be further configured to connect to another electronic device, for example, an AR device or a computer.

The charging management module 280 is configured to receive a charging input from a charger. The charger may be a wireless charger or a wired charger. In some embodiments in which wired charging is used, the charging management module 280 may receive a charging input from the wired charger through the USB interface 270. In some embodiments in which wireless charging is used, the charging management module 280 may receive a wireless charging input through a wireless charging coil of the electronic device. The charging management module 280 may further supply power to the electronic device by using the power management module 281 while charging the battery 282.

The power management module 281 is configured to connect to the battery 282 and the charging management module 280 to the processor 210. The power management module 281 receives an input of the battery 282 and/or an input of the charging management module 280, and supplies power to the processor 210, the internal memory 221, the camera 230, the display 240, and the like. The power management module 281 may be further configured to monitor parameters such as a battery capacity, a quantity of battery cycles, and a battery health status (electric leakage or impedance). In some other embodiments, the power management module 281 may alternatively be disposed in the processor 210. In some other embodiments, the power management module 281 and the charging management module 280 may alternatively be disposed in a same component.

The mobile communications module 291 may provide a solution that is for wireless communication including 2G/3G/4G/5G and the like and that is applied to the electronic device. The mobile communications module 291 may include a filter, a switch, a power amplifier, a low noise amplifier (LNA), and the like.

The wireless communications module 292 may provide a wireless communications solution that is applied to the electronic device and that includes wireless local area networks (WLAN) (for example, a wireless fidelity (Wi-Fi) network), Bluetooth (BT), a global navigation satellite system (GNSS), frequency modulation (FM), a near field communication (NFC) technology, and an infrared (IR) technology. The wireless communications module 292 may be one or more components integrating at least one communications processor module.

In some embodiments, an antenna 1 of the electronic device is coupled to the mobile communications module 291, and an antenna 2 is coupled to the wireless communications module 292, so that the electronic device can communicate with another device. Specifically, the mobile communications module 291 may communicate with another device through the antenna 1, and the wireless communications module 292 may communicate with another device through the antenna 2.

Figure 3:
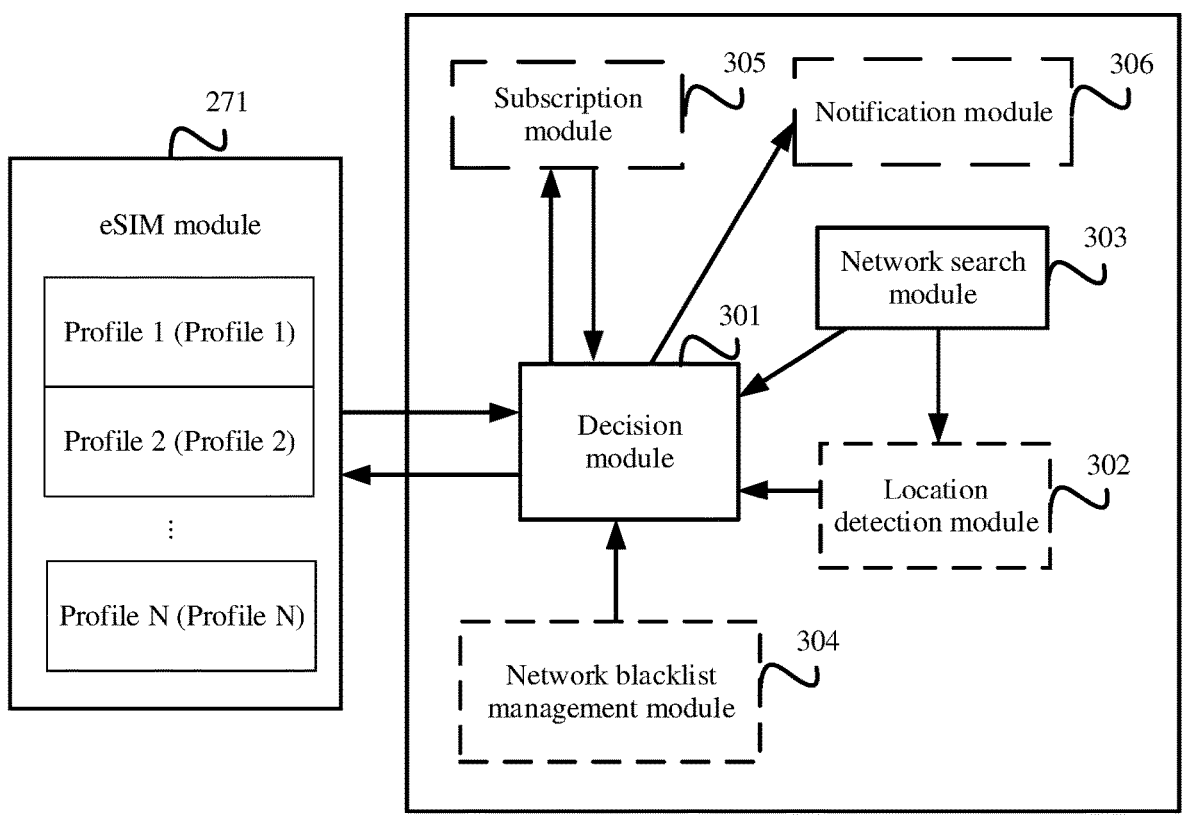
FIG. 3 is a schematic diagram of a software structure of an electronic device according to an embodiment of this application.

For example, FIG. 3 is a schematic diagram of a software architecture of an electronic device according to an embodiment of this application. The electronic device specifically includes a decision module 301 and a network search module 303. In some other embodiments, the electronic device further includes one or more of a location detection module 302, a network blacklist management module 304, a subscription module 305, and a notification module 306.

It should be noted that the decision module 301, the location detection module 302, the network search module 303, the network blacklist management module 304, the subscription module 305, and the notification module 306 shown in FIG. 3 may be integrated in one or more processing units in the processor 210 shown in FIG. 2. For example, some or all of the decision module 301, the location detection module 302, the network search module 303, the network blacklist management module 304, the subscription module 305, and the notification module 306 may be integrated in one or more processors such as an application processor or a dedicated processor. For example, the dedicated processor in the embodiments of this application may be a DSP, an application specific integrated circuit (ASIC) chip, or the like. In some other embodiments, the decision module 301, the location detection module 302, the network search module 303, the network blacklist management module 304, the subscription module 305, and the notification module 306 may be separately integrated in different modules, some of the modules may be integrated in a same module, or the like. This is not limited in embodiments of the present disclosure. For example, the network blacklist management module 304 is integrated in the eSIM module 271 shown in FIG. 2, and the decision module 301, the location detection module 302, the network search module 303, the subscription module 305, and the notification module 306 are integrated in the processor 210 shown in FIG. 2. For another example, the location detection module 302 is integrated in the positioning sensor (for example, a GPS sensor) shown in FIG. 2, the network search module 303 and the notification module 306 are integrated in the mobile communications module 291 shown in FIG. 2, the network blacklist management module 304 is integrated in the eSIM module 271 shown in FIG. 2, and the decision module 301, the subscription module 305, and the notification module 306 are integrated in the processor 210 shown in FIG. 2.

It should be understood that the software structure shown in FIG. 2 is only an example. The electronic device in the embodiments of this application may have more or fewer modules than the electronic device shown in the figure, or two or more modules may be combined. Various modules shown in the figure may be implemented in hardware, software, or a combination of hardware and software that includes one or more signal processing and/or application-specific integrated circuits.

The decision module 301 is configured to: when a first trigger event is detected, (for example, the electronic device is powered on, an airplane mode is disabled, or the electronic device disconnects from a network), trigger the network search module 303 to search for a network based on at least two stored profiles, to obtain network search results corresponding to the at least two profiles, and then the network search module 303 returns the obtained network search results corresponding to the at least two profiles to the decision module 301. Then, the decision module 301 selects one profile from the at least two profiles based on the at least two network search results (for ease of description, the following uses an example in which the profile selected by the decision module 301 is a first profile, and the first profile is used to access a first operator network), and notifies the eSIM module 271 of the first profile. When a currently activated profile (for ease of description, the following uses an example in which the currently activated profile in the profiles stored in the electronic device is a second profile, and the second profile is used to access a second operator network) is not the first profile, the eSIM module 271 deactivates the second profile or stops activation of the second profile, automatically activates the first profile, then sends a profile activation notification to the decision module 301, and initiates a procedure of accessing the first operator network based on the first profile.

The at least two profiles may be obtained by the network search module 303 from the eSIM module 271, or the at least two profiles may be sent by the decision module 301 to the network search module 303. For example, when detecting the first trigger event, the decision module 301 may send the at least two profiles to the network search module 303, or send, to the network search module 303, information (for example, at least two profile indexes) used to indicate the at least two profiles. The network search module 303 may obtain the at least two profiles from the eSIM module 271 based on the information used to indicate the at least two profiles.

It should be noted that the network search module 303 may search for a network based on all the stored profiles, or may search for a network based on some of all the stored profiles. A specific profile that is in the stored profiles and based on which the network search module 303 searches for a network may be related to a specific preset policy. For example, the network search module 303 searches for a network based on a profile that is in all the stored profiles and that is used to access an operator network in a country to which a geographic location of the user belongs. For example, the electronic device already stores a profile 1, a profile 2, and a profile 3. The profile 1 is used to access a network of a Chinese operator, and the profile 2 and the profile 3 are used to access networks of UK operators. When the country to which the geographic location of the user belongs is the UK, the network search module 303 searches for a network based on the profile 2 and the profile 3. For example, a profile based on which the electronic device searches for a network may be determined by the decision module 301, or may be determined by the network search module 303.

In some other embodiments, when detecting the first trigger event, the decision module 301 may first trigger the network search module 303 to search for a network based on the second profile, and determine whether a PLMN obtained in current network search is the same as a PLMN obtained in previous network search. If the PLMNs are different, a network search notification is sent to the decision module 301. After receiving the network search notification, the decision module 301 triggers the network search module 303 to search for a network based on the at least two stored profiles. Alternatively, in some other embodiments, when detecting the first trigger event, the decision module 301 may first send a location detection notification to the location detection module 302. After receiving the location detection notification, the location detection module 302 obtains a current geographic location of the user, and determines whether a distance between the obtained current geographic location of the user and a previously obtained geographic location of the user exceeds a first threshold. If the distance exceeds the first threshold, a network search notification is sent to the decision module 301. After receiving the network search notification, the decision module 301 triggers the network search module 303 to search for a network based on the at least two stored profiles. Further, in some other embodiments, if the distance between the obtained current geographic location of the user and the previously obtained geographic location of the user does not exceed the first threshold but exceeds a second threshold, the network search module 303 is triggered to search for a network based on an activated profile. The network search module 303 searches for a network based on the second profile, and determines whether a PLMN obtained in current network search is the same as a PLMN obtained based on the second profile in previous network search. If the PLMNs are different, the location detection module 302 is triggered to send a network search notification to the decision module 301. It should be noted that the first threshold and the second threshold may be preconfigured. The first threshold is greater than the second threshold. For example, the first threshold is 300 km, and the second threshold may be 150 km.

In some other embodiments, the decision module 301 is configured to: when detecting the first trigger event, or when receiving the network search notification sent by the location detection module 302 or the network search module 303, trigger the subscription module 305 to obtain service package information of operators corresponding to the at least two profiles. The subscription module 305 obtains the service package information corresponding to the at least two profiles and sends the service package information to the decision module 301. The decision module 301 may select one profile from the at least two profiles based on the service package information corresponding to the at least two profiles and/or the network search results corresponding to the at least two profiles.

In some other embodiments, the decision module 301 is further configured to: when detecting the first trigger event, or when receiving the network search notification sent by the location detection module 302 or the network search module 303, obtain a network blacklist from the network blacklist management module 304. The decision module 301 selects the first profile from the at least two profiles with reference to the network blacklist, to avoid accessing a network in the network blacklist.

In addition, when the second profile is different from the first profile, the eSIM module 271 sends an operator network switching notification to the decision module 301. After receiving the operator network switching notification, the decision module 301 sends, to the second operator network, a request to subscribe to a call transfer service and/or a request to stop charging a service package corresponding to the second profile. After receiving, by using the subscription module 305, a response for subscribing to the call transfer service and/or a response for stopping charging for the service package corresponding to the second profile, the decision module 301 triggers the eSIM module 271 to activate the first profile and deactivate the second profile. The eSIM module 271 sends, to the decision module 301, a notification indicating that the first profile has been activated, and the decision module 301 initiates, based on the first profile, a procedure of accessing the first operator network.

Further, after receiving, by using the subscription module 305, the response for subscribing to the call transfer service and/or the response for stopping charging for the service package corresponding to the second profile, the decision module 301 further triggers the notification module 306 to indicate an operator to stop charging for the service package corresponding to the second profile, and/or to transfer an incoming call for a telephone number included in the second profile to a telephone number included in the first profile.

In some other embodiments, after accessing the first operator network based on the first profile, the decision module 301 triggers the subscription module 305 to obtain the service package information corresponding to the first profile, and after receiving the service package information corresponding to the first profile sent by the subscription module 305, triggers the notification module 306 to notify the user of the service package information corresponding to the first profile. In this way, the user can learn of a service package of an operator network.

The following embodiments may be implemented in an electronic device having the foregoing hardware structure and/or software structure.

The following describes an operator network switching method in the embodiments of this application by using an example in which the electronic device stores at least two profiles, and the first profile is a currently activated profile in the stored profiles.

Figure 4:
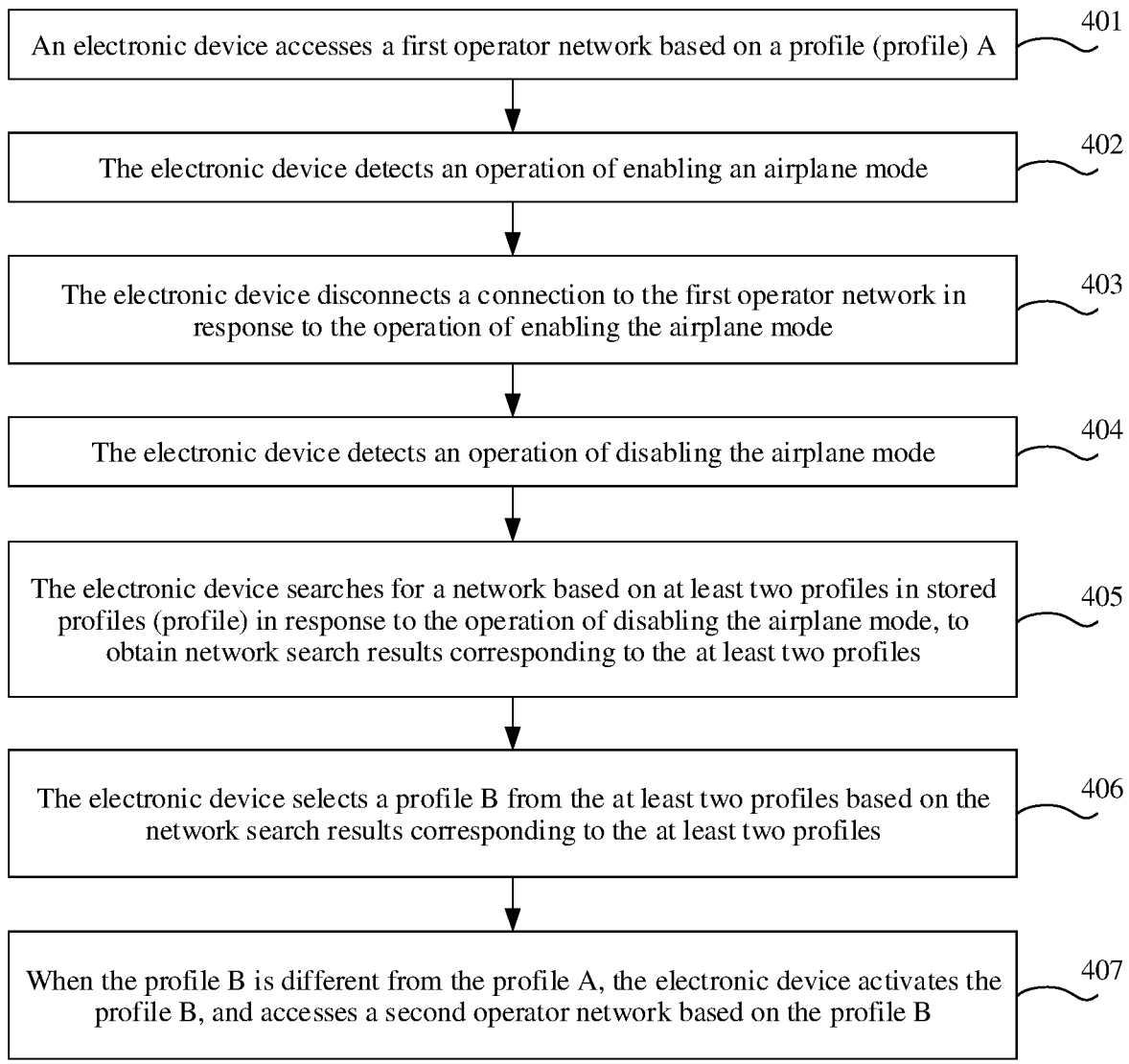
FIG. 4 is a schematic flowchart of an operator network switching method according to an embodiment of this application.

For example, a scenario of enabling and disabling an airplane mode is used as an example. FIG. 4 is a schematic flowchart of an operator network switching method according to an embodiment of this application. The method specifically includes the following steps.

401: An electronic device accesses a first operator network based on a first profile.

In some embodiments, after accessing the first operator network, the electronic device may notify the user that the electronic device has accessed the first operator network. For example, the electronic device may notify the user of an identifier of a first operator, to notify the user that the electronic device has accessed the first operator network. For example, the identifier of the first operator is China Mobile. After accessing the first operator network, the electronic device may display an identifier of China Mobile to the user on a display, to notify the user that the electronic device has accessed a network of China Mobile. For example, the electronic device displays the identifier of China Mobile in a status bar of a user interface shown in FIG. 5A.

402: The electronic device detects an operation of enabling an airplane mode.

For example, the operation of enabling the airplane mode may be an operation performed by the user on a virtual button used to control enabling or disabling of the airplane mode. The virtual button used to control enabling or disabling of the airplane mode may be located in a system setting interface, or may be located in a pull-up interface, a drop-down interface, or the like. For example, the system setting interface may be displayed by the electronic device in response to an operation of tapping a setting icon. For example, the pull-up interface may be displayed by the electronic device in response to an operation of swiping up on the display by the user. For example, the drop-down interface may be displayed by the electronic device in response to an operation of swiping down on the display by the user.

Figure 5A:
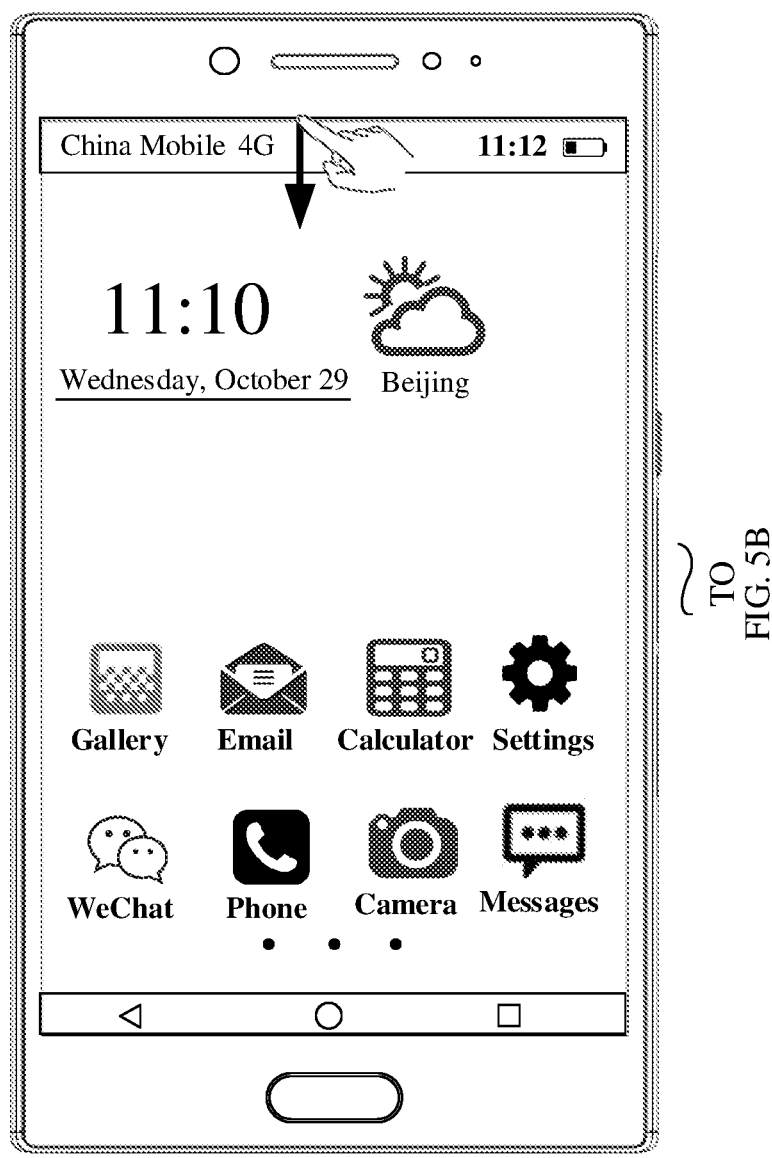
FIG. 5A to FIG. 5D are schematic diagrams of other interfaces according to embodiments of this application.
Figure 5B:
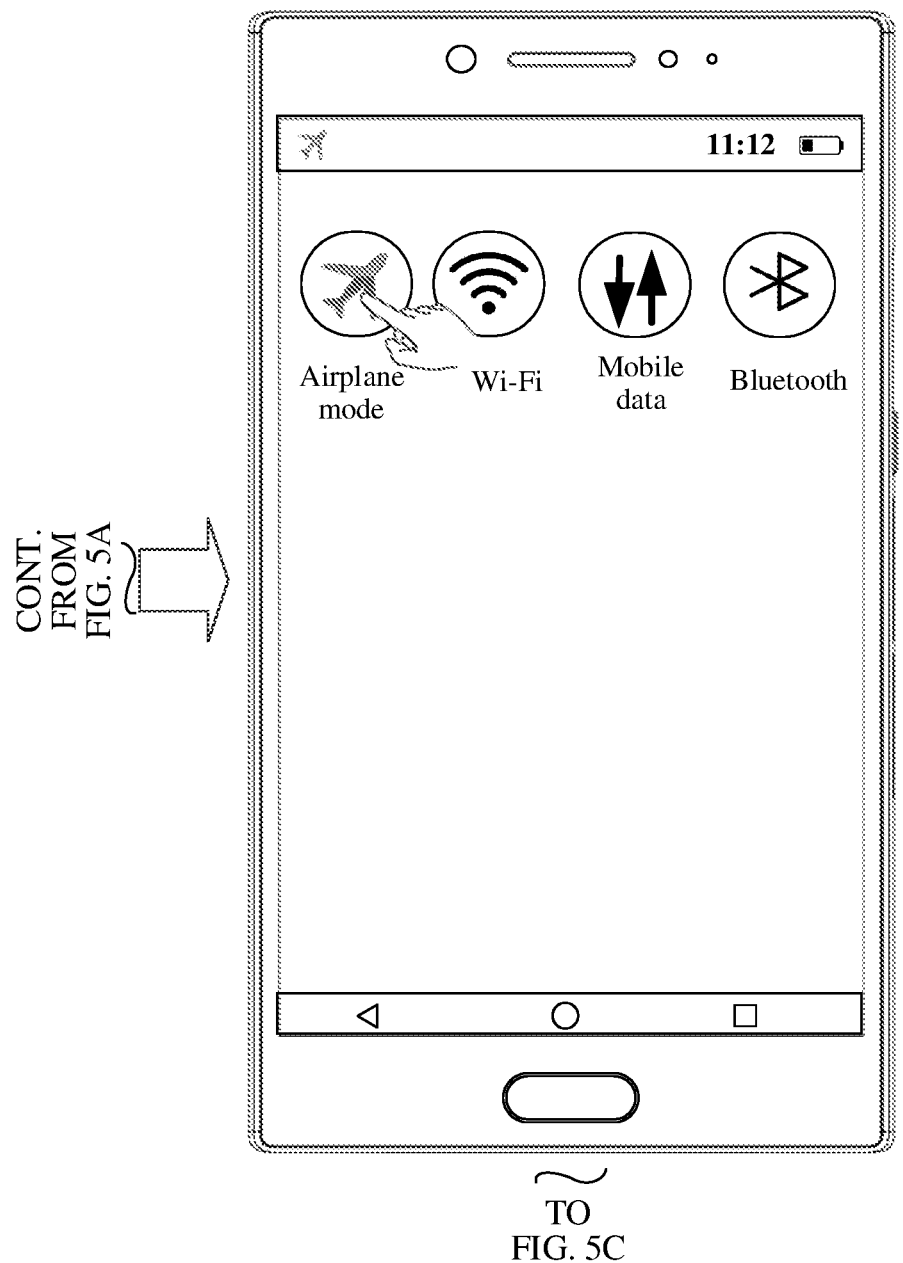

For example, the electronic device displays the user interface shown in FIG. 5A on the display, detects an operation of swiping down on the display by the user, and displays a control interface on the display in response to the operation of swiping down by the user, where the control interface includes the virtual button used to control enabling or disabling of the airplane mode. For example, the control interface may be a user interface shown in FIG. 5B.

For another example, the operation of enabling the airplane mode may alternatively be a shortcut gesture operation, for example, an operation of swiping up with three fingers, or a voice instruction.

403: The electronic device disconnects a connection to the first operator network in response to the operation of enabling the airplane mode.

In some other embodiments, in response to the operation of enabling the airplane mode, the electronic device may further notify the user that the airplane mode is enabled. For example, the electronic device may further replace the identifier of the first operator with an identifier of the airplane mode in the user interface, to notify the user that the airplane mode is enabled. For example, in response to an operation of tapping the virtual button used to control enabling or disabling of the airplane mode, the electronic device displays the identifier of the airplane mode in the status bar of the user interface, and no longer displays the identifier of the first operator, to notify the user that the airplane mode is enabled and the connection to the first operator network is disconnected.

404: The electronic device detects an operation of disabling the airplane mode.

For example, after the electronic device enables the airplane mode, the operation of disabling the airplane mode may be an operation on the virtual button used to control enabling or disabling of the airplane mode, a shortcut gesture operation, or a voice instruction.

405: The electronic device searches for a network based on at least two profiles in stored profiles in response to the operation of disabling the airplane mode, to obtain network search results corresponding to the at least two profiles.

Figure 5C:
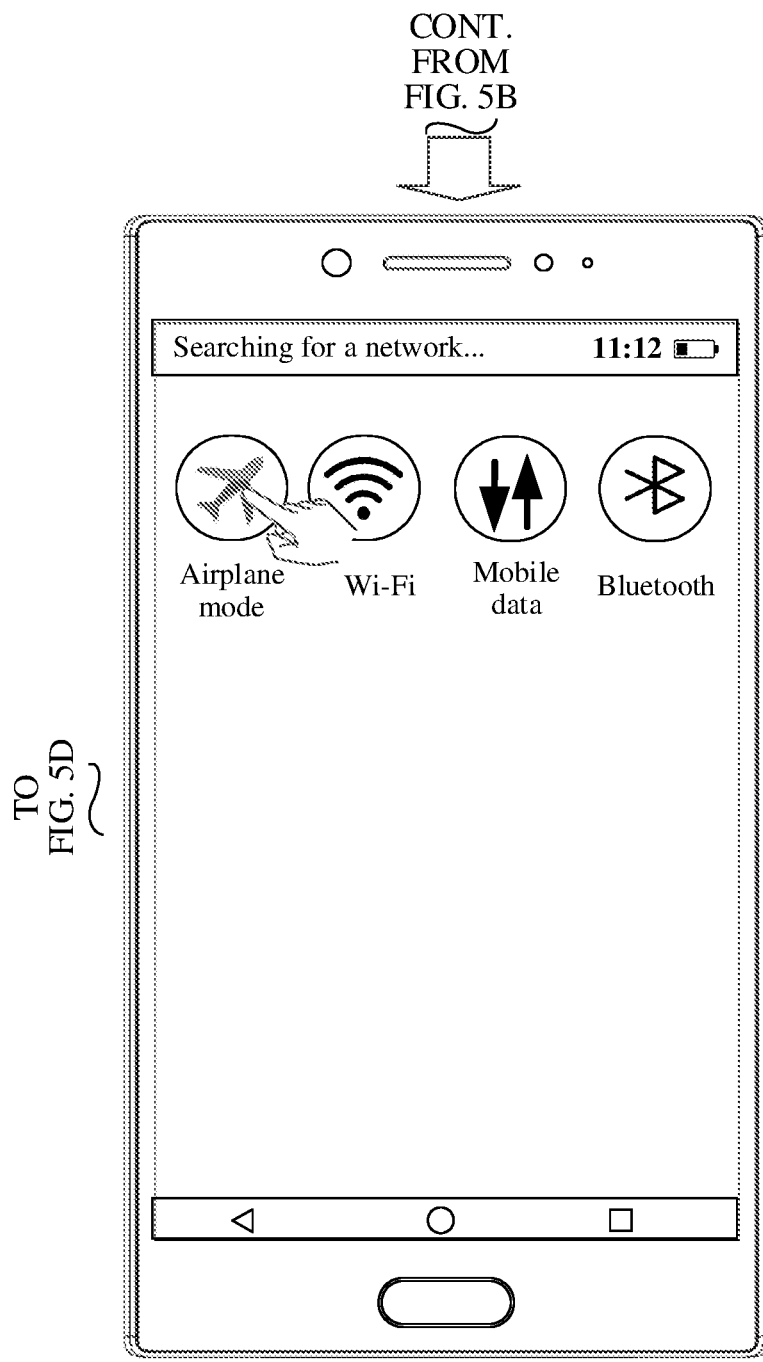

In some embodiments, in response to the operation of disabling the airplane mode, the electronic device further notifies the user that the electronic device is searching for a network. For example, the electronic device displays prompt information on the display in response to an operation of tapping the virtual button used to control enabling or disabling of the airplane mode by the user. The prompt information is used to notify that the electronic device is searching for a network. For example, the prompt information may be "searching for a network". For example, as shown in FIG. 5C, the electronic device replaces the identifier of the airplane mode with "searching for a network" in the status bar, to notify the user that the electronic device disables the airplane mode and is searching for a network.

For example, the at least two profiles stored in the electronic device include a profile 1 and a profile 2. In this case, one of the profile 1 and the profile 2 is a first profile. The electronic device searches for a network based on the profile 1 and the profile 2 in response to the operation of disabling the airplane mode, to obtain a network search result corresponding to the profile 1 and a network search result corresponding to the profile 2. For another example, the at least two profiles stored in the electronic device include a profile 1, a profile 2, and a profile 3. In this case, one of the profile 1, the profile 2, and the profile 3 is a first profile in the profiles stored in the electronic device. In response to the operation of disabling the airplane mode, the electronic device may search for a network based on the profile 1, the profile 2, and the profile 3, or may search for a network based on the profile 1 and the profile 2, or may search for a network based on the profile 2 and the profile 3, or may search for a network based on the profile 1 and the profile 3. In this case, a profile that is in the profile 1, the profile 2, and the profile 3 and based on which the electronic device searches for a network is related to a specific preset policy. For details, refer to the foregoing related description about the specific preset policy in the software architecture in FIG. 3. Details are not described herein again.

For example, the electronic device may search for a network based on the at least two profiles in the stored profiles with reference to a device hardware capability (for example, a radio frequency capability and a modulation and demodulation capability) of the electronic device, to obtain network search results corresponding to the at least two profiles. This helps improve network search efficiency.

For example, the electronic device searches for a network based on the profile 1. The profile 1 may be the first profile in the profiles stored in the electronic device, or may be another profile. This is not limited in embodiments of the present disclosure. For example, the radio frequency capability of the electronic device does not support a network standard 5G, and supports network standards 2G, 3G, and 4G. The electronic device may search for a network based on the profile 1 in 2G, 3G, and 4G networks, and may not search for a network in a 5G network. For another example, when searching for a network based on the profile 1, the electronic device finds both the 3G network and the 4G network. If the modulation and demodulation capability of the electronic device in 3G is better than that in 4G, when a network signal strength of the 3G network is slightly weaker than that of the 4G network, the electronic device may use found information related to the 3G network as the network search result corresponding to the profile 1. However, when a difference between the network signal strength of the 4G network and the network signal strength of the 3G network exceeds a threshold, that is, when the network signal strength of the 4G network is much stronger than that of the 3G network, the electronic device uses found information related to the 4G network as the network search result corresponding to the profile 1.

The network search result may include one or more of a network identifier, a network standard, a network signal strength, information used to indicate whether the device of the eSIM profile is roaming, and the like. For example, the network identifier may be a PLMN of an operator or a customized identifier. The network standard may include 2G, 3G, 4G, 5G, a higher network standard (for example, 6G), or the like. The network signal strength may include related parameters such as a received signal code power (RSCP) and/or a received signal strength indication (RSSI). For example, in this embodiment, information of one or more bits may be used to indicate whether the profile is roaming. For example, a bit value 1 indicates that the profile is roaming, and a bit value 0 indicates that the profile is not roaming.

In addition, in some embodiments, when the electronic device does not find any network based on a profile, a network search result corresponding to the profile is null.

For example, the electronic device searches for a network based on N stored profiles, where N is a positive integer greater than or equal to 2. Network search results corresponding to the N profiles may be shown in Table 1.

TABLE 1

| Profile index | Network identifier | Whether the profile is roaming | Network standard | Network signal strength (dbm) |
|---|---|---|---|---|
| 1 | 46000 | Yes (Y) | 4G | −30 |
| 2 | 46005 | No (N) | 3G | −60 |
| 3 | 46001 | Yes (Y) | 5G | −35 |
| 4 | NULL | NA | NA | NA |
| 5 | 46000 | Yes (Y) | 3G | −80 |
| 6 | 46002 | No (N) | 5G | −30 |
| ... | ... | ... | ... | ... |
| N | 46011 | No (N) | 4G | −32 |

The electronic device in FIG. 3 is used as an example. In response to the operation of disabling the airplane mode, the decision module 301 triggers the network search module 303 to search for a network based on the at least two profiles in the stored profiles with reference to the device hardware capability, to obtain network search results corresponding to the at least two profiles.

In some embodiments, the electronic device may further search for a network based on the at least two profiles in the stored profiles with reference to a network blacklist. The network blacklist may include one or more network identifiers. In this way, the electronic device avoids a network in the network blacklist when searching for a network. For example, the network blacklist may be preconfigured. For example, the network blacklist is preconfigured before delivery of the electronic device. For another example, different geographic locations correspond to different network blacklists. In response to the operation of disabling the airplane mode, the electronic device may obtain a network blacklist corresponding to a current geographic location of the user from a server or another device based on the geographic location. This helps improve network search reliability and network blacklist configuration flexibility. For example, the current geographic location of the user may be obtained by the electronic device based on information obtained by a GPS sensor, or may be determined based on a location based service (LBS). A manner of obtaining the geographic location information is not limited in embodiments of this application.

Further, in some embodiments, in response to the operation of disabling the airplane mode, the electronic device obtains a current geographic location (the geographic location is referred to as a geographic location 1) of the user, and determines whether a distance between the geographic location 1 and a geographic location 2 exceeds a first threshold. The geographic location 2 may be obtained by the electronic device in response to the operation of enabling the airplane mode by the user, or the geographic location 2 is a geographic location obtained last time before the geographic location 1 is obtained. It should be noted that the geographic location obtained last time before the geographic location 1 is obtained may be referred to as a geographic location obtained last time, and the geographic location obtained last time before the electronic device obtains the geographic location 1 may be obtained in response to the operation of enabling the airplane mode by the user, or may be obtained in response to another trigger event. This is not limited in embodiments of the present disclosure. If the distance between the geographic location 1 and the geographic location 2 exceeds the first threshold, the electronic device searches for a network based on the at least two profiles in the stored profiles. For example, if the distance between the geographic location 1 and the geographic location 2 does not exceed the first threshold, the electronic device may search for a network based on the first profile, to access the first operator network. For another example, when the distance between the geographic location 1 and the geographic location 2 does not exceed the first threshold but exceeds a second threshold, the electronic device searches for a network based on the first profile to obtain a PLMN of an operator (the following uses an example in which the PLMN of the operator is a PLMN 1). The electronic device determines whether the PLMN 1 is the same as a PLMN 2. The PLMN 2 may be a PLMN of the operator of the first operator network that the electronic device accesses before the airplane mode is enabled, or the PLMN 2 may be a PLMN obtained last time before the electronic device obtains the PLMN 1. The PLMN obtained last time before the PLMN 1 is obtained may also be referred to as a PLMN obtained last time. It should be noted that the PLMN obtained last time before the PLMN 1 is obtained may be obtained before the electronic device responds to enabling the airplane mode by the user, or may be obtained in response to another trigger event. This is not limited in embodiments of the present disclosure. If the PLMN 1 is different from the PLMN 2, the electronic device searches for a network based on the at least two profiles in the stored profiles. If the PLMN 1 is the same as the PLMN 2, the electronic device may search for a network based on the first profile, to access the first operator network. This helps to reduce a quantity of times of network searching by the electronic device, and reduce power consumption of the electronic device.

In some other embodiments, in response to the operation of disabling the airplane mode, the electronic device may further first search for a network based on the first profile to obtain a PLMN A of an operator, and determine whether the PLMN A is the same as a PLMN B. For the PLMN B, refer to related descriptions of the PLMN 2 in the foregoing example. If the PLMN A is the same as the PLMN B, the electronic device may access the operator network based on the first profile. If the PLMN A is different from the PLMN B, the electronic device performs step 405.

For example, the at least two profiles that are in the stored profiles and based on which the electronic device searches for a network may be some or all of the stored profiles.

406: The electronic device selects a second profile from the at least two profiles based on the network search results corresponding to the at least two profiles.

For example, the electronic device may select, from the at least two profiles, a profile whose network search result meets a preset condition as the second profile. For example, the network search result includes a network identifier, a network signal strength, a network standard, and indication information used to indicate whether the profile is roaming. The electronic device may select, from the at least two profiles, a profile that indicates a non-roaming state and a network signal strength greater than a preset threshold as the second profile. The preset threshold may be set based on an actual requirement. Network search results corresponding to profiles whose profile indexes are 1, 2, 3, 4, and 5 in Table 1 are used as an example. In the network search results of the profiles whose profile indexes are 1, 2, 3, 4, and 5, a profile that indicates a non-roaming state and a network signal strength greater than a preset threshold (for example, −50 dbm) is a profile whose profile index is 2. In this case, the profile whose profile index is 2 is a profile selected by the electronic device from the five profiles.

For another example, the electronic device may separately score, according to a preset algorithm based on a network search result corresponding to each of the at least two profiles, operator networks found based on the profiles. The score is used to comprehensively evaluate the operator network found based on the profile. The electronic device selects one profile from the at least two profiles as the second profile based on scores corresponding to the at least two profiles. For example, the electronic device may select a profile corresponding to a largest score in the scores corresponding to the at least two profiles as the second profile. The preset algorithm may be set based on an actual situation. For example, parameters included in the network search result are a network identifier, a network signal strength, information used to indicate whether the profile is roaming, and a network standard. Different parameters may correspond to different weights. A specific weight may be set based on an actual situation. For example, weights of different parameters may be shown in Table 2.

TABLE 2

| Parameter | Weight |
|---|---|
| Whether the profile is roaming | 0.4 |
| Network signal strength | 0.2 |
| Network standard | 0.2 |
| Network identifier | 0.2 |

For another example, the electronic device may further select one profile from the at least two profiles as the profile 2 based on the network search results corresponding to the at least two profiles with reference to the device hardware capability (for example, the radio frequency capability and the modulation and demodulation capability). For example, the network search results corresponding to the at least two profiles are network search results corresponding to profiles whose profile indexes are 6 and N in Table 1. When a modulation and demodulation capability of the electronic device in 4G is better than that in 5G, although a network signal strength in the network standard 4G is slightly weaker than a network signal strength in the network standard 5G, the electronic device selects a profile whose profile index is N as the second profile.

For another example, the electronic device may further select one profile from the at least two profiles as the second profile based on the network search results corresponding to the at least two profiles with reference to service package information corresponding to the at least two profiles. This helps an operator network to be accessed based on the selected profile to meet requirements of users for Internet access and voice communication, and saves costs to some extent.

The service package information includes package information in a roaming scenario and package information in a non-roaming scenario. For example, the service package information may include data traffic information, a voice call duration, and a quantity of SMS messages in the non-roaming scenario, and data traffic information, a voice call duration, and a quantity of SMS messages in the roaming scenario. The service package information may further include tariff information of the service package. For example, the tariff information of the service package includes package tariff information in the non-roaming scenario and package tariff information in the roaming scenario. The service package information may be sent by an operator or a third party to the electronic device when the electronic device subscribes to or provides the service package, or may be obtained by the electronic device from service package information stored in the electronic device based on a profile in response to the operation of disabling the airplane mode, or may be obtained by the electronic device from an operator or a third party based on a profile. A manner of obtaining service package information based on a profile is not limited in embodiments of this application.

Figure 6:
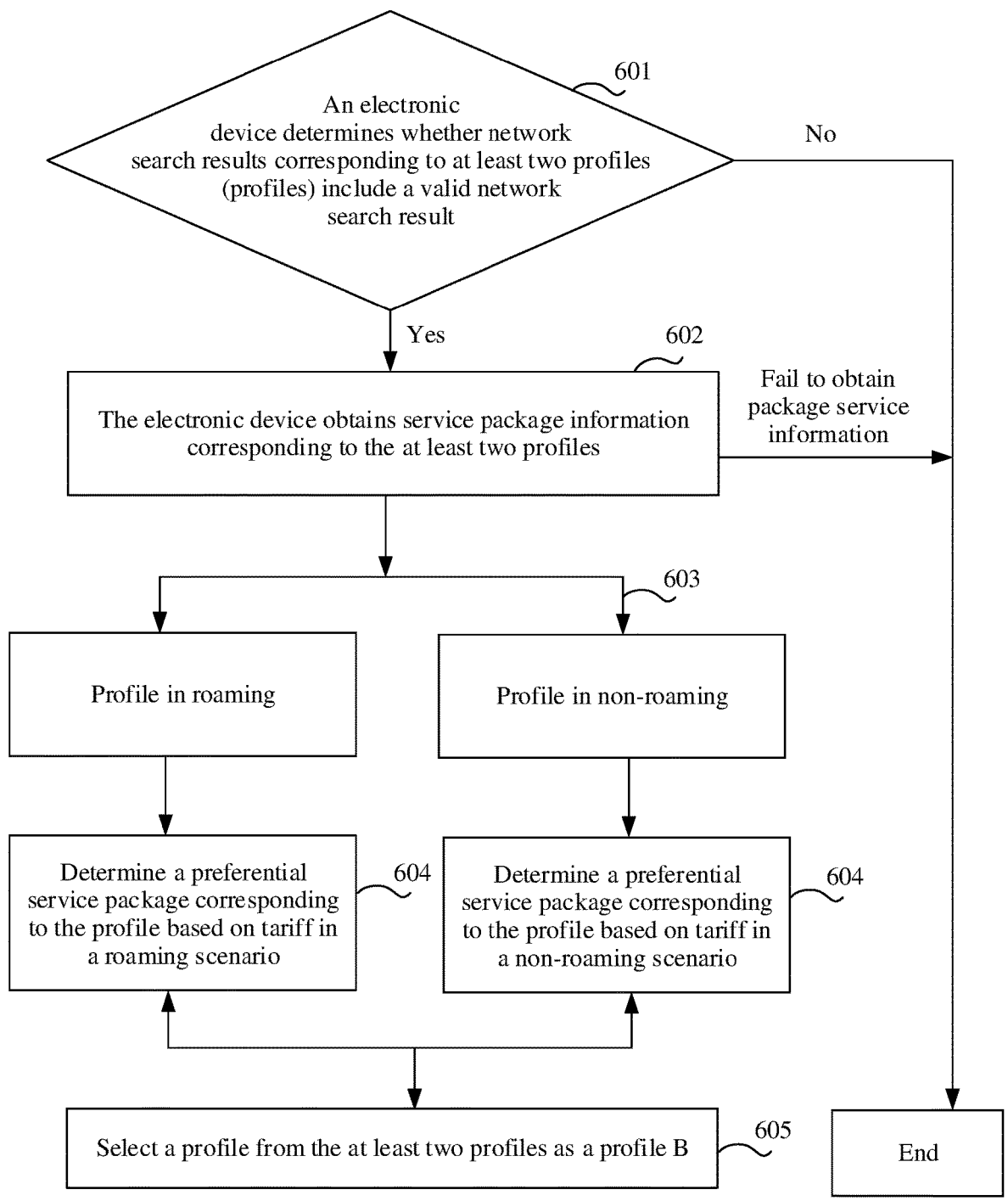
FIG. 6 is a schematic flowchart of a profile selecting method according to an embodiment of this application.

For example, for details about a process in which the electronic device selects one profile from the at least two profiles as the second profile with reference to the service package information, refer to the schematic flowchart of a profile selection method shown in FIG. 6. The method specifically includes the following steps.

601: The electronic device determines whether the network search results corresponding to the at least two profiles include a valid network search result. If yes, step 602 is performed. Otherwise, this procedure ends. When a network search result is not null, the network search result is a valid network search result. For example, when searching for a network based on the profile 1, the electronic device finds no network, a network search result corresponding to the profile 1 is null, and the network search result corresponding to the profile 1 is an invalid network search result. For another example, when searching for a network based on the profile 2, the electronic device finds an operator network, a network search result corresponding to the profile 2 is not null, and the network search result may include information such as a network identifier, a network signal strength, and a network standard. Therefore, the network search result corresponding to the profile 2 is a valid network search result.

602: The electronic device obtains service package information corresponding to the at least two profiles. For a manner of obtaining the service package information, refer to the foregoing related descriptions. Details are not described herein again.

603: The electronic device determines a profile in a roaming state and a profile in a non-roaming state in the at least two profiles based on the network search results corresponding to the at least two profiles.

604: The electronic device determines a preferential service package corresponding to any profile in the roaming state based on a tariff in the roaming scenario in service package information corresponding to the profile, and determines a preferential service package corresponding to any profile in the non-roaming state based on a tariff in the non-roaming scenario in service package information corresponding to the profile.

605: The electronic device selects one profile from the at least two profiles as the second profile based on the preferential service packages determined in step 604.

It should be noted that a sequence of step 601 and step 602 is not limited in embodiments of this application, provided that step 601 and step 602 are before step 603.

For example, the at least two profiles are profiles whose profile indexes are 1, 2, 5, and 6 in Table 1. Service package information corresponding to the profile whose profile index is 1 is used to indicate a service package whose monthly rental is 39 yuan, specifically including 5G (MB) traffic, 300 SMS messages, and 120 minutes of voice calls in the non-roaming scenario, and services are charged separately based on actual usage in the roaming scenario. Service package information corresponding to the profile whose profile index is 2 is used to indicate a service package whose monthly rental is 59 yuan, specifically including 10G traffic, 300 SMS messages, and 180 minutes of voice calls in the non-roaming scenario. Service package information corresponding to the profile whose profile index is 5 is used to indicate a service package whose monthly rental is 29 yuan, specifically including 3G traffic, 100 SMS messages, and 60 minutes of voice calls, and services are separately charged based on actual usage in the roaming scenario. Service package information corresponding to the profile whose profile index is 6 is used to indicate a service package whose monthly rental is 98 yuan, specifically including 20G traffic, 50 SMS messages, and 100 minutes of voice calls in the non-roaming scenario. It can be learned from Table 1 that the profiles whose profile indexes are 1 and 5 correspond to information indicating that the profiles are roaming, and are profiles in roaming Therefore, the electronic device determines, based on tariffs in the roaming scenario in the service package information corresponding to the profile indexes 1 and 5, preferential service packages corresponding to the profiles whose profile indexes are 1 and 5. The profiles whose profile indexes are 2 and 6 correspond to information indicating that the profiles are not roaming, and the electronic device determines, based on tariffs in the non-roaming scenario in the service package information corresponding to the profile indexes 2 and 6, preferential service packages corresponding to the profiles whose profile indexes are 2 and 6. The electronic device may select, based on the determined preferential service packages, one profile from the profiles whose profile indexes are 1, 2, 5, and 6. A specific profile to be selected is related to a specific implementation policy. For example, when the user requires relatively a long voice call duration, if a tariff of the preferential service package corresponding to the profile 2 is cheaper, the electronic device may select the profile whose profile index is 2. For another example, when the user requires relatively large traffic, the electronic device may select the profile whose profile index is 6.

In addition, in some other embodiments, the electronic device may score, based on network search results and the service package information corresponding to the at least two profiles, an operator network found based on the profiles, where the score is used to comprehensively evaluate the operator network found based on the profiles. The electronic device selects one profile from the at least two profiles as the second profile based on scores corresponding to the at least two profiles. For example, the electronic device may select a profile corresponding to a largest score in the scores corresponding to the at least two profiles as the second profile. The preset algorithm may be set based on an actual situation. For example, different weights may be set for different parameters in different network search results and different service package information. A specific weight may be set based on an actual situation. For example, weights of different parameters may be shown in Table 3.

TABLE 3

| Parameter | Weight |
|---|---|
| Whether the profile is roaming | 0.3 |
| Network signal strength | 0.2 |
| Network standard | 0.2 |
| Data traffic | 0.15 |
| Voice duration | 0.1 |
| SMS | 0.05 |

The foregoing merely describes an example in which the electronic device selects one profile from the at least two profiles. In this embodiment, the electronic device may alternatively select one profile from the at least two profiles in another manner. For example, when selecting a profile from the at least two profiles, the electronic device may consider only the service package information. In this case, for example, in response to the operation of disabling the airplane mode, the electronic device may select one profile from the at least two profiles as the second profile based on the service package information corresponding to the at least two profiles. Then, the electronic device searches for a network based on the second profile.

407: When the second profile is different from the first profile, the electronic device activates the second profile, and accesses a second operator network based on the second profile. In some embodiments, when the electronic device supports access to only one operator network, the electronic device may further deactivate the first profile.

Figure 5D:
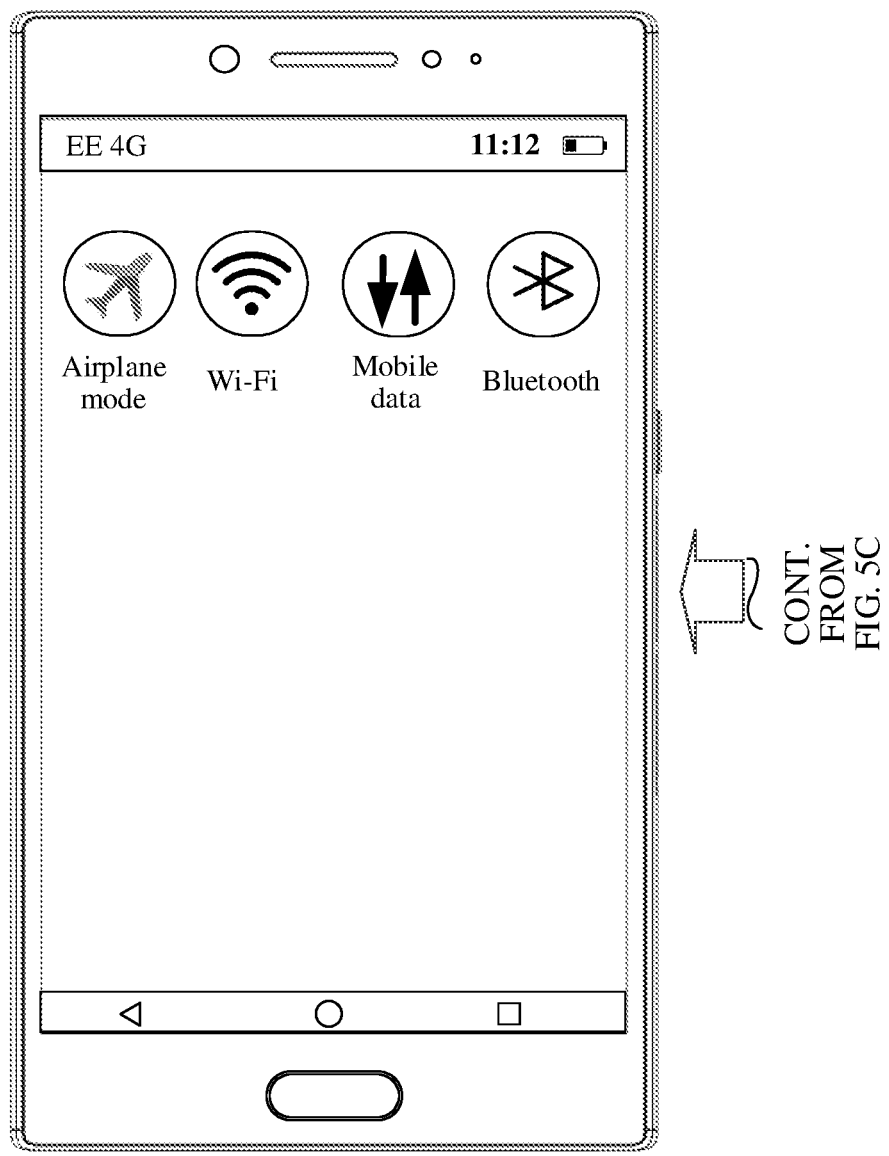

For example, after accessing the second operator network, the electronic device may further notify the user that the electronic device has accessed the second operator network. For example, the electronic device may display an identifier of a second operator in the status bar, to notify the user that the electronic device has accessed the second operator network. For example, the identifier of the second operator is EE. After accessing a network of the operator EE, the electronic device may replace "searching for a network" in the status bar with EE, for example, a user interface shown in FIG. 5D.

It should be noted that the second operator network may be different from or the same as the first operator network.

In this embodiment, because the electronic device can automatically select a profile, the electronic device can switch profiles based on an actual situation without the user's manual operation in the conventional technology, to access a corresponding operator network. This meets a requirement of the user and improves user experience.

In addition, this embodiment may be further used in a power-on and power-off scenario. In the power-on and power-off scenario, step 402 to step 405 may be replaced with the following steps.

402': The electronic device detects a power-off operation. For example, the power-off operation may be an operation of pressing a power button, or may be a shortcut gesture operation, or may be a voice instruction.

403': The electronic device powers off in response to the power-off operation, and disconnects a connection to the first operator network.

404': The electronic device detects a power-on operation. For example, the power-on operation may be an operation of pressing the power button.

405': The electronic device searches for a network based on at least two profiles in stored profiles in response to the power-on operation, to obtain network search results corresponding to the at least two profiles.

In addition, this embodiment may be further used in another network disconnection scenario. This is not limited in embodiments of the present disclosure.

Figure 7:
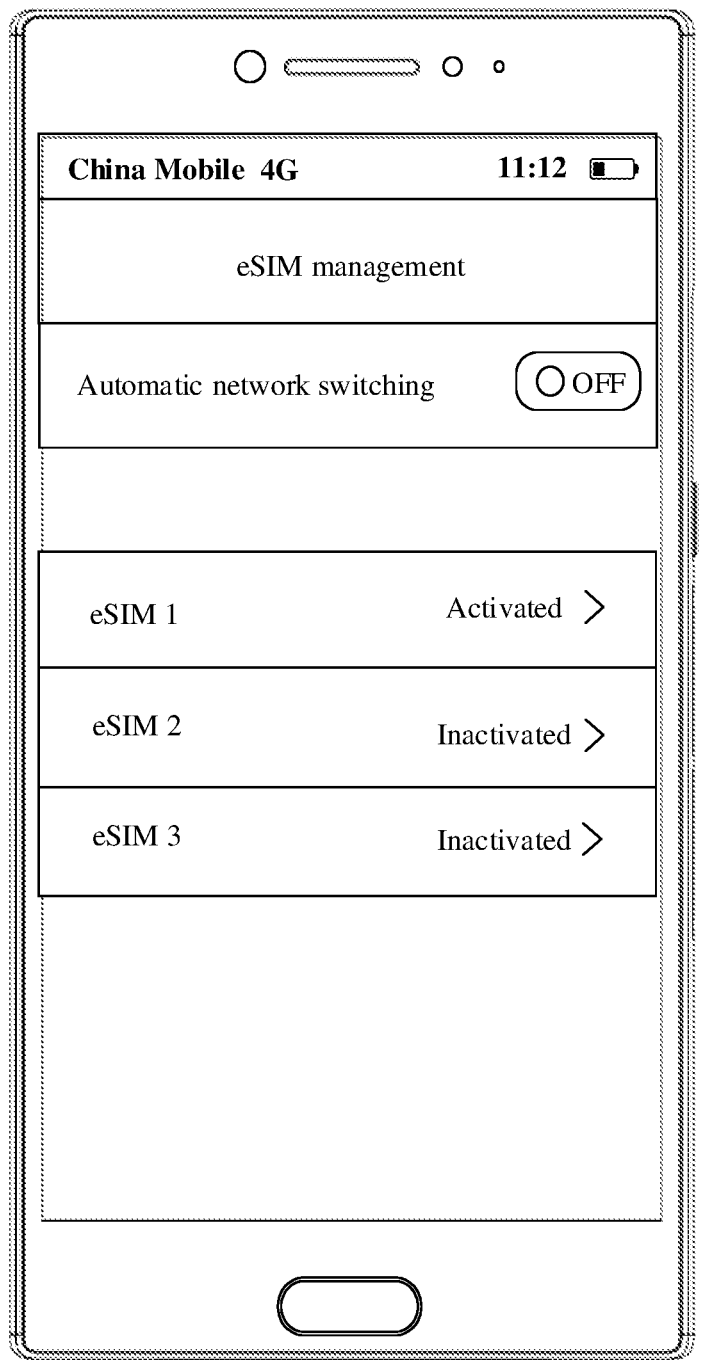
FIG. 7 is a schematic diagram of another interface according to an embodiment of this application.

In some embodiments, when an automatic network switching function is enabled, the electronic device detects the operation of disabling the airplane mode, the power-on operation, or the like, and initiates a network search process based on the at least two profiles in the stored profiles. This helps improve interaction between the user and the device. For example, when the automatic network switching function of the electronic device is disabled, the electronic device detects the operation of disabling the airplane mode, and may search for a network based on the last activated first profile. For details, refer to a related implementation in the conventional technology. Details are not described herein again. For example, the user may enable or disable the automatic network switching function by operating a virtual button used to control enabling or disabling of the automatic network switching function. For another example, the user may further enable or disable the automatic network switching function in another manner, for example, a shortcut gesture operation or a voice instruction. For example, the virtual button used to control enabling or disabling of the automatic network switching function may be located in a user interface shown in FIG. 7, or may be located in a system setting interface. This is not limited in embodiments of the present disclosure.

Figure 8A:
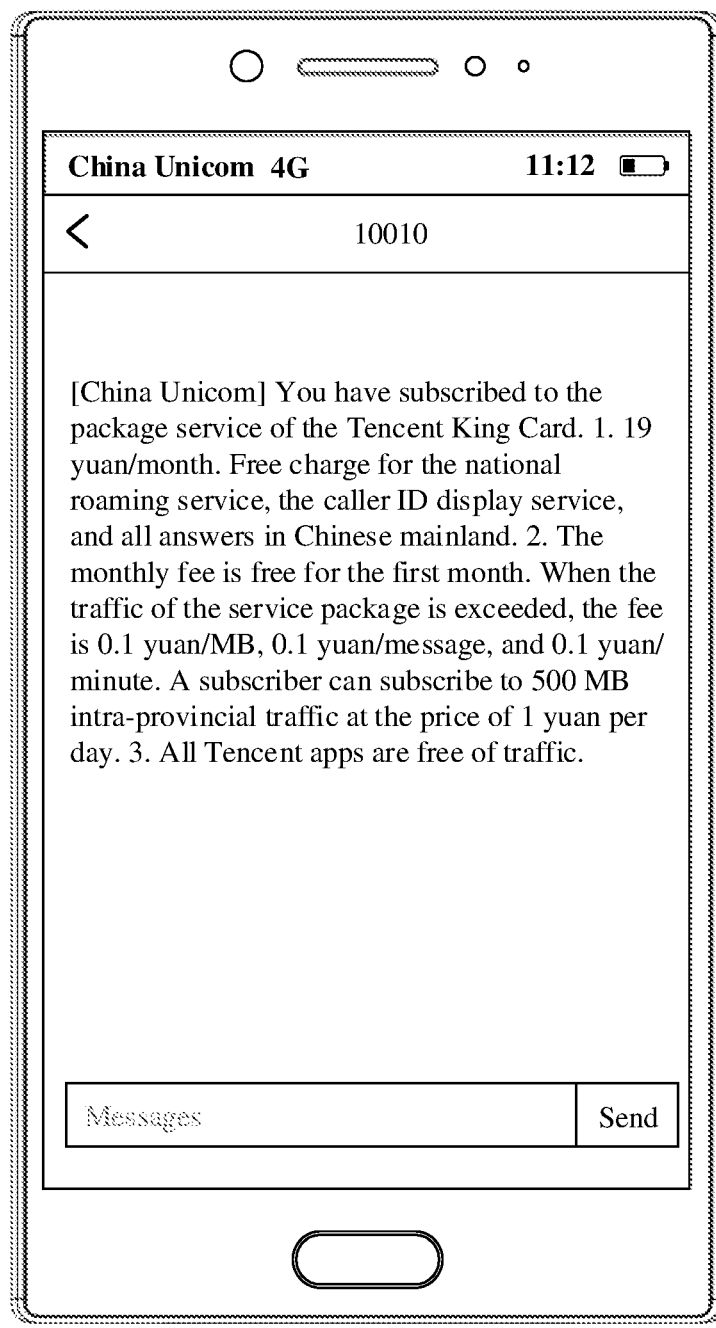
FIG. 8A is a schematic diagram of another interface according to an embodiment of this application.
Figure 8B:
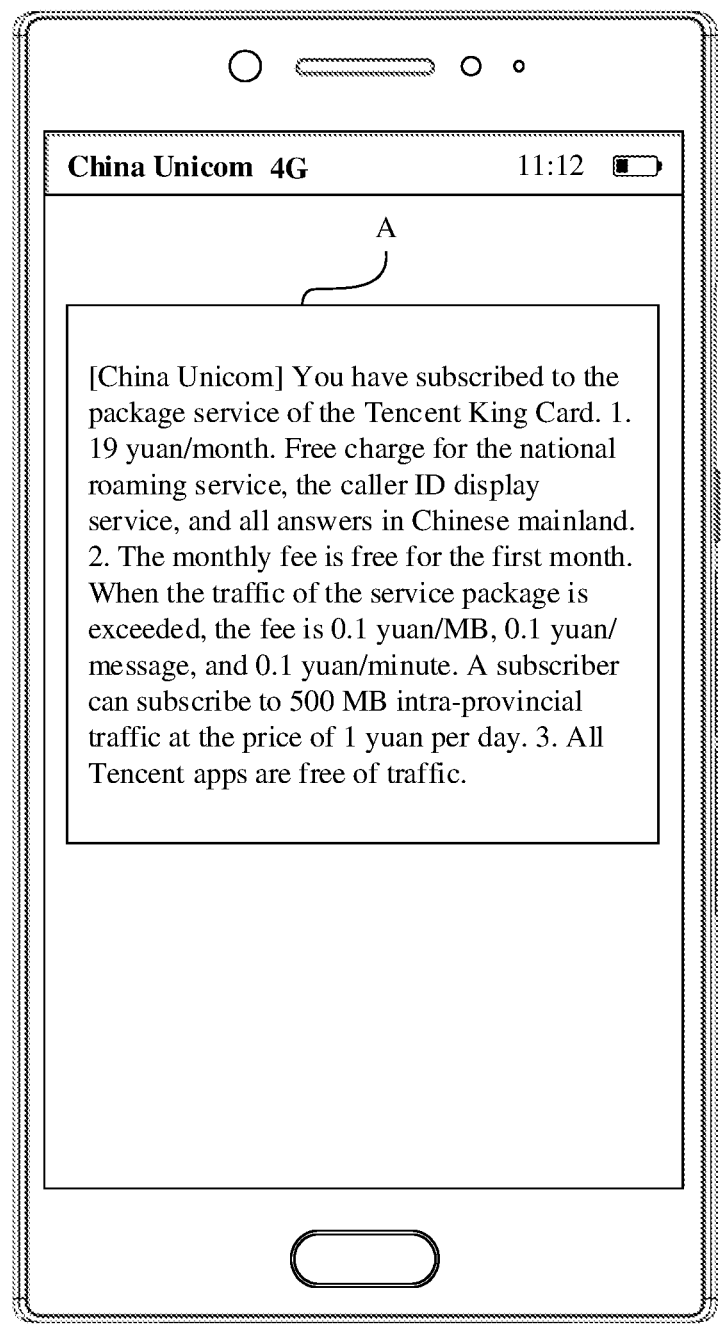
FIG. 8B is a schematic diagram of another interface according to an embodiment of this application.

Further, in some embodiments, when the first profile is different from the second profile, the electronic device may further notify the user of a service package corresponding to the second profile, so that the user learns of the used service package after accessing the second operator network. For example, the electronic device may notify the user by using an SMS message. The SMS message includes information used to indicate the service package corresponding to the second profile. The SMS message may be sent by the operator or a third party to the electronic device after the electronic device accesses the second operator network. For example, the service package corresponding to the second profile is a Tencent King card package of China Unicom, and the electronic device may notify the user of the service package corresponding to the second profile by using a user interface shown in FIG. 8A. For another example, the electronic device may further notify the user of the service package corresponding to the second profile by displaying a prompt box on the display. For example, the service package corresponding to the second profile is the Tencent King card package of China Unicom, and the electronic device may notify the user of the service package corresponding to the second profile by displaying a prompt box A shown in FIG. 8B on the display. In some embodiments, when notifying the user of the service package corresponding to the second profile by using the SMS message or the prompt box, the electronic device may further play a ring or vibrate.

In addition, the electronic device may further prompt the user in another manner, for example, voice. After accessing the second operator network, the electronic device receives a call request of the second operator network, and broadcasts, to the user in response to an operation of answering the call request by the user, a service package used by the user after the second operator network is accessed.

It should be noted that when the first profile is different from the second profile, the electronic device may actively obtain the service package corresponding to the profile from the second operator network, or the second operator network may actively deliver, to the electronic device, the service package corresponding to the profile after the electronic device successfully accesses the second operator network. This is not limited in embodiments of the present disclosure.

Further, when the first profile is different from the second profile, the electronic device further sends, to the first operator network, a request to stop charging for the service package corresponding to the first profile. This helps save user costs. After receiving the request sent by the electronic device to stop charging for the service package corresponding to the first profile, the first operator network stops charging for the service package corresponding to the first profile, and returns, to the electronic device, a response for stopping charging for the service package corresponding to the first profile. After receiving the response for stopping charging for the service package corresponding to the first profile, the electronic device notifies the user that charging for the service package corresponding to the first profile has stopped. For a manner of notifying the user that charging for the service package corresponding to the first profile is stopped, refer to the foregoing manner of notifying the user of the service package corresponding to the second profile.

In some actual scenarios, for example, the user is in a short business trip or on a short journey, for example, 7 days or 10 days, and a validity period of the enabled service package corresponding to the second profile is relatively short. In this case, the electronic device may not send, to the first operator, request information for stopping charging for the service package corresponding to the first profile. For example, when the first profile is different from the second profile, the electronic device determines whether a validity period of the service package corresponding to the second profile exceeds a preset period, and when the validity period of the service package corresponding to the second profile exceeds the preset period, the electronic device sends, to the first operator network, the request to stop charging for the service package corresponding to the first profile. When the validity period of the service package corresponding to the second profile does not exceed the preset period, the electronic device does not send, to the first operator network, the request to stop charging for the service package corresponding to the first profile. The preset period may be set based on an actual situation. For example, in China, a service package is usually paid by month. Therefore, the preset period may be set to one month.

For example, in this embodiment, the stopping charging for the service package corresponding to the first profile may be understood as: the first operator no longer charges the user for the service package corresponding to the first profile, that is, the first operator changes a state of the service package corresponding to the first profile to a suspended state. Further, the first operator may change the service package corresponding to the first profile to a suspension and number reservation service.

In some other embodiments, when the first profile is different from the second profile, the electronic device further sends a request to subscribe to a call transfer service to the first operator network. The call transfer service request is used to transfer an incoming call for a telephone number A to a telephone number B, where the telephone number A is a telephone number included in the first profile, and the telephone number B is a telephone number included in the second profile. After receiving the request to subscribe to the call transfer service that is sent by the electronic device, the first operator network enables the call transfer service, transfers an incoming call for the telephone number A to the telephone number B, and then sends a response for subscribing to the call transfer service to the electronic device. The response for subscribing to the call transfer service is used to indicate that the call transfer service is successfully subscribed to. After the call transfer service is successfully subscribed to, when the electronic device uses the telephone number B, the electronic device can receive an incoming call for the telephone number A. In this way, the user does not miss calls. It should be noted that, for example, after receiving the response for subscribing to the call transfer service, the electronic device may activate the second profile.

In some other embodiments, after receiving the response for subscribing to the call transfer service, the electronic device may further notify the user that an incoming call for the telephone number A is to be transferred to the telephone number B. In this way, the user learns that an incoming call for the telephone number A is transferred to the telephone number B.

Figure 9:
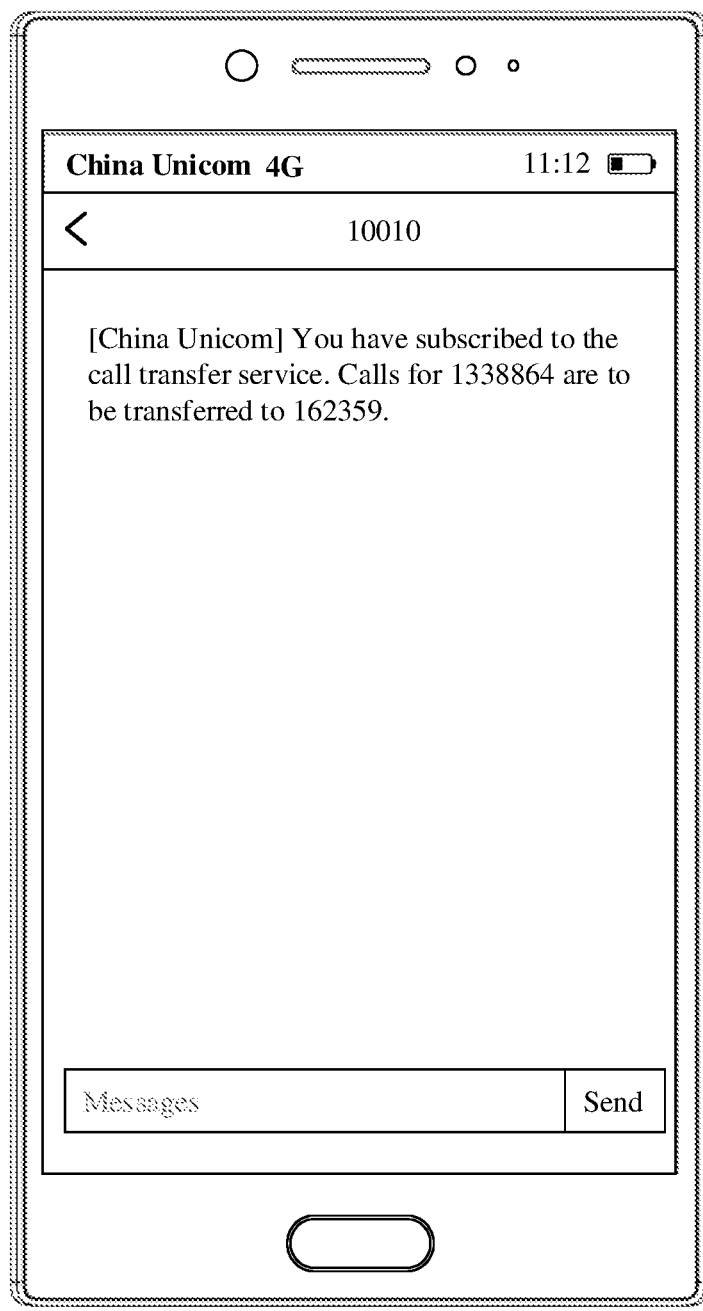
FIG. 9 is a schematic diagram of another interface according to an embodiment of this application.

For example, the first operator network may send the response for subscribing to the call transfer service to the user by using an SMS message. In this case, the electronic device may notify the user, by using an SMS message, that the call transfer service is subscribed to. For example, the first operator network is China Unicom, the telephone number A is 1338864, and the telephone number B is 162359. The electronic device may notify, by using a user interface shown in FIG. 9, the user that the call transfer service is subscribed to. For another example, the electronic device may further notify, by using a prompt box, the user that the call transfer service is subscribed to, and an incoming call for the telephone number A is to be transferred to the telephone number B.

Further, when reactivating the first profile or accessing the first operator network based on the first profile, the electronic device may further send a request to cancel the call transfer service to the first operator network.

It should be noted that, in an example of prompting the user by using a prompt box, the electronic device may notify, by using one prompt box, the user of one or more of stopping charging for the service package corresponding to the first profile, the service package corresponding to the second profile, and subscribing to the call transfer service. A quantity of prompt boxes used to prompt the user may be set based on an actual requirement.

In addition, in this embodiment, the electronic device may obtain service package information, a request to subscribe to the call transfer service, a request to disable a service package, or the like from an operator network. To improve security of interaction between the electronic device and the operator network, each time the electronic device sends a message (for example, a service request) to the operator network, that is, before the operator network provides a service for the electronic device, validity of the electronic device needs to be authenticated or authorized.

After the authentication succeeds, a corresponding service is provided for the electronic device. The structure of the electronic device shown in FIG. 3 is used as an example. The electronic device sends a service request (for example, a request to obtain a service package, a request to subscribe to or cancel a call transfer service, or a request to disable a service package) to the operator network by using the subscription module 305. To facilitate authentication on the electronic device by the operator network, an entitlement service (ES) protocol stack may be integrated in the subscription module. The ES protocol stack may include a private authentication standard specified by an operator or an international standard.

Figure 10:
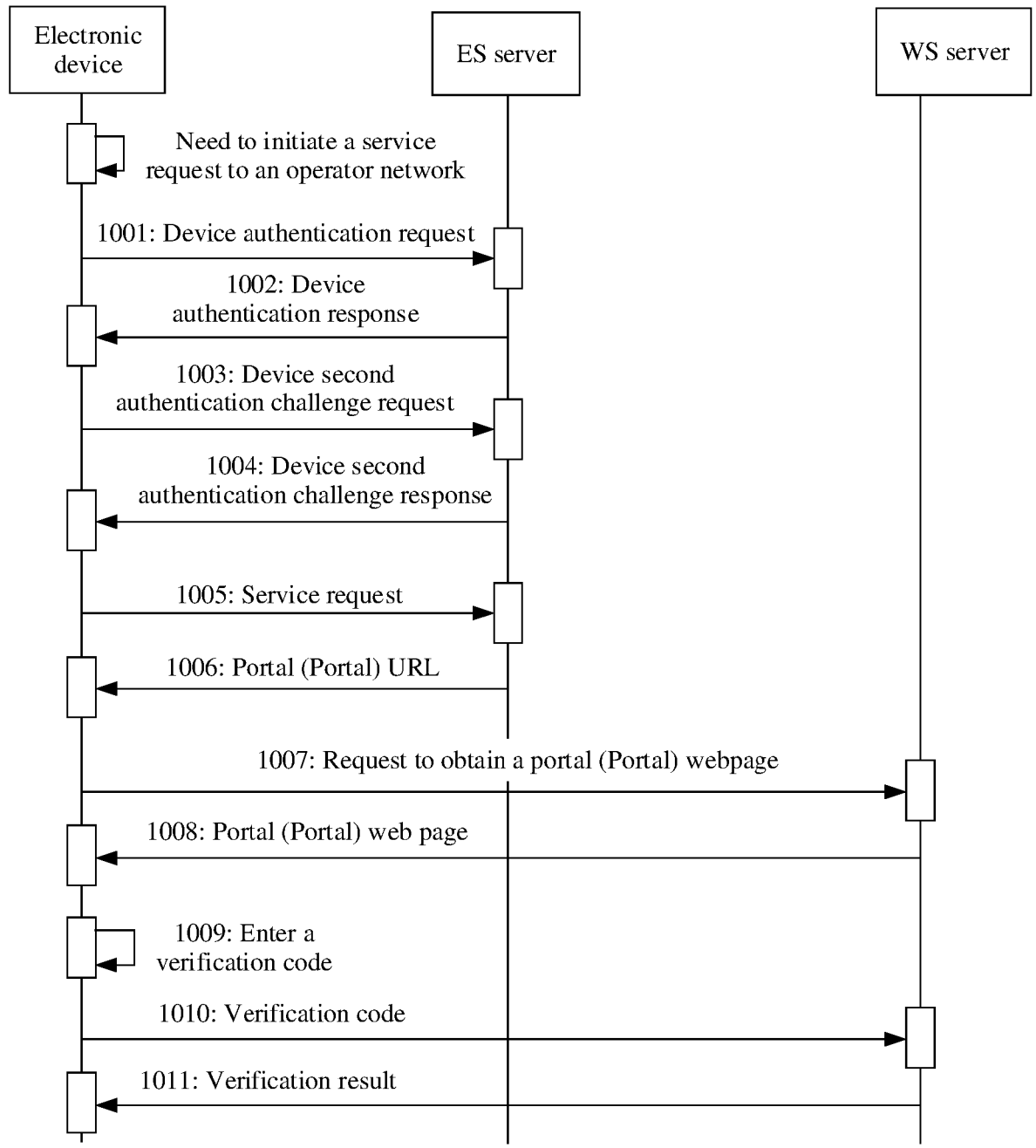
FIG. 10 is a schematic flowchart of a device authentication or authorization method according to an embodiment of this application.

For example, the operator network may implement authentication or authorization on the electronic device by using an ES server and a WS server. For example, a procedure of an authentication or authorization method may be shown in FIG. 10, and specifically includes the following steps:

1001: When the electronic device needs to initiate a service request to the operator network, the electronic device sends a device authentication request to the ES server.

1002: After receiving the device authentication request, the ES server returns a device authentication response to the electronic device, where the device authentication response is used to indicate the electronic device to initiate a second authentication challenge.

1003: After receiving the device authentication response, the electronic device sends a device second authentication challenge request to the ES server.

1004: After receiving the device second authentication challenge request, the ES service returns a device second authentication challenge response to the terminal, where the device second authentication challenge response is used to indicate that authentication on the electronic device succeeds.

1005: After receiving the device second authentication challenge response, the electronic device sends the service request to the ES server.

1006: After receiving the service request sent by the electronic device, the ES server returns a portal URL to the electronic device.

1007: The electronic device sends a request to obtain a portal web page to the WS server based on the portal URL.

1008: The WS server receives the request to obtain the portal web page, and returns the portal web page to the electronic device.

1009: After receiving the portal web page, the electronic device receives an operation of entering a verification code by the user on the portal web page, and enters the verification code on the portal web page.

1010: After detecting that the user completes entering the verification code, the electronic device sends the verification code to the WS server for verification.

1011: After receiving the verification code, the WS server verifies the verification code, and returns a verification result to the electronic device.

It should be noted that, in some embodiments, the foregoing authentication process is completed when the profile is activated. In this case, when the electronic device sends a message (for example, a service request) to the operator network, validity of the electronic device may no longer be authenticated or authorized. For example, the electronic device performs the foregoing authentication process when the first profile is activated. When the electronic device needs to send a request to subscribe to the call transfer service to the first operator network, the electronic device may not perform the foregoing authentication process, but perform the procedure of subscribing to the call transfer service.

The following describes the method in the embodiments of this application with reference to a specific scenario. For example, a user resides in China and is to be on the business trip to the UK for one month. The user is currently in China and plans to be on the business trip to the UK for one month from Jul. 1, 2019 to Jul. 31, 2019 (Beijing time). A profile currently activated on the user's electronic device is a profile 1, and the electronic device currently accesses a network of China Mobile based on the profile 1, to provide a service for the user. However, to save costs, the user subscribes to an eSIM service package of the UK operator EE in China in advance. A validity period is one month. After detecting that the user subscribes to the eSIM service package, the UK operator EE or a third party (for example, a card vendor) sends a profile 2 to the electronic device. Profiles stored in the electronic device include the profile 1 and the profile 2. The user enables the airplane mode on the electronic device after boarding the plane on Jun. 30, 2019 (Beijing time), and disables the airplane mode after arriving in the UK on Jul. 1, 2019 (Beijing time). The electronic device automatically searches for a network based on the profile 1 and the profile 2, and activates the profile 2 and then deactivates the profile 1 based on network search results, so that the electronic device can access a network of the UK operator EE based on the profile 2. In this way, the electronic device can find a network based on the profile 1, and perform communication. In addition, because the electronic device automatically activates the profile 2 without the user's manual operation, user experience is further improved.

In addition, an embodiment of this application further provides an operator network switching method. The following describes an operator network switching method by using an example in which the electronic device stores at least two profiles, and a first profile is a currently activated profile in the stored profiles.

Figure 11:
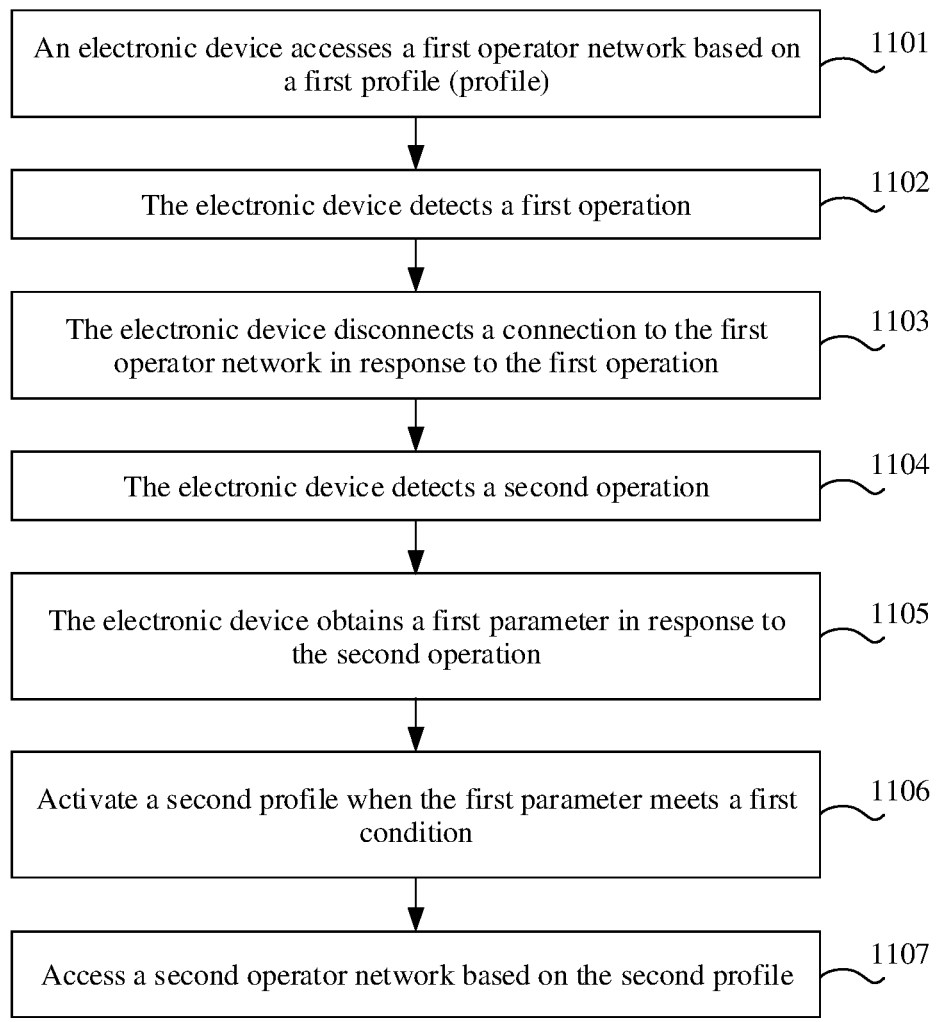
FIG. 11 is a schematic flowchart of another operator network switching method according to an embodiment of this application.

For example, FIG. 11 is a schematic flowchart of an operator network switching method according to an embodiment of this application. The method specifically includes the following steps.

1101: An electronic device accesses a first operator network based on a first profile.

1102: The electronic device detects a first operation, where the first operation is used to disconnect a connection to the first operator network.

For example, the first operation is an operation of enabling an airplane mode. For another example, the first operation is a power-off operation.

1103: Disconnect the connection to the first operator network in response to the first operation.

1104: The electronic device detects a second operation, where the second operation is used to restore a network connection.

For example, the second operation is an operation of disabling the airplane mode. For another example, the second operation is a power-on operation.

1105: The electronic device obtains a first parameter in response to the second operation.

1106: When the first parameter meets a first condition, the electronic device activates a second profile in the stored profiles, where the second profile is different from the first profile.

For example, the first parameter is a first geographic location, and the first geographic location is used to indicate a current geographic location of the electronic device. The meeting a first condition by the first parameter may be understood as: A distance between the first geographic location and a second geographic location is greater than or equal to a first threshold. The second geographic location is obtained before the electronic device disconnects a connection to the first operator network in response to the corresponding operation.

For another example, the first parameter is a first PLMN. For example, the electronic device obtains the first PLMN by searching for a network based on the first profile. The meeting the first condition by the first parameter may be understood as: The first PLMN is different from the second PLMN. The second PLMN is a PLMN used when the electronic device accesses the first operator network.

The foregoing describes examples in which the first parameter is a geographic location and a PLMN. In this embodiment, the first parameter may alternatively be another parameter. This is not limited in embodiments of the present disclosure.

Specifically, the second profile is a profile different from the first profile in the stored profiles. For example, the second profile may be determined based on network search results corresponding to some profiles in the stored profiles. For a manner of determining the some profiles, refer to related descriptions in FIG. 4. Details are not described herein. For example, the second profile is determined based on a network search result corresponding to the second profile and a network search result corresponding to a third profile. In addition, in some other embodiments, the electronic device may further determine the second profile by referring to a network blacklist, service package information, or the like. This is not limited in embodiments of the present disclosure.

1107: The electronic device accesses a second operator network based on the second profile.

In the operator network switching method shown in FIG. 11, a call transfer service may also be enabled, charging for a service package corresponding to the first profile may be stopped, the first profile may be deactivated, or the like. For specific implementations, refer to related descriptions in FIG. 4. Details are not described herein again.

The foregoing embodiments may be used separately, or may be used in combination to achieve different technical effects.

In the foregoing embodiments provided in this application, the method provided in the embodiments of this application is described from the perspective in which the electronic device serves as the execution body. To implement functions in the methods provided in the embodiments of this application, the electronic device may include a hardware structure and/or a software module, and implement the functions in a form of the hardware structure, the software module, or a combination of the hardware structure and the software module. Whether a function in the foregoing functions is performed by using the hardware structure, the software module, or the combination of the hardware structure and the software module depends on particular applications and design constraint conditions of the technical solutions.

Figure 12:
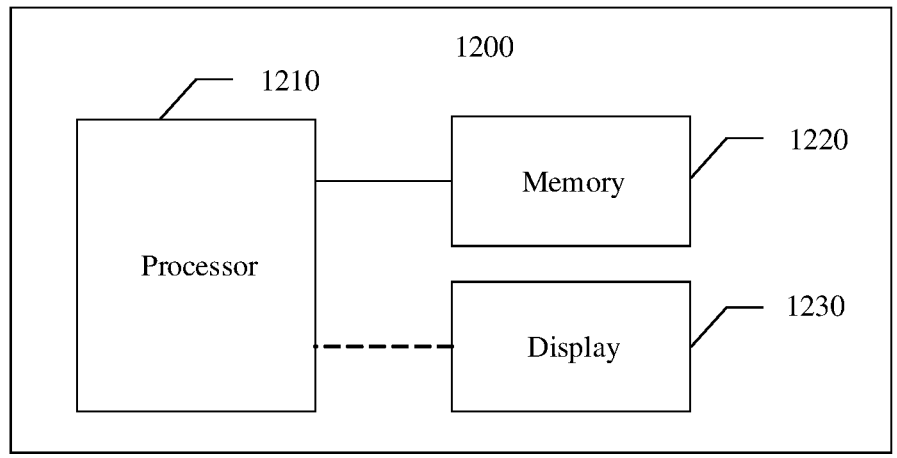
FIG. 12 is a schematic diagram of a structure of another electronic device according to an embodiment of this application.

Based on a same concept, FIG. 12 shows an electronic device 1200 according to this application. For example, the electronic device 1200 includes at least one processor 1210 and a memory 1220. The processor 1210 is coupled to the memory 1220 and a display 1230. Couplings in the embodiments of this application are indirect couplings or communication connections between apparatuses, units, or modules, and may be implemented in electronic, mechanical, or other forms, and are used for information exchange between the apparatuses, the units, or the modules.

Specifically, the memory 1220 is configured to store program instructions. When the processor 1210 invokes the program instructions stored in the memory 1220, the electronic device 1200 is enabled to perform the operator network switching method in the embodiments of this application. For example, when the processor 1210 invokes the program instructions stored in the memory 1220, the electronic device 1200 is enabled to perform the operator network switching method shown in FIG. 4.

In some embodiments, the electronic device 1200 further includes the display 1230. The display 1230 is configured to notify the user that a call transfer service is enabled, or notify the user of a service package corresponding to a second profile or the like.

It should be understood that the electronic device 1200 may be configured to implement the operator network switching method in the embodiments of this application. For related features, refer to the foregoing descriptions. Details are not described herein.

A person of ordinary skill in the art may clearly know that the embodiments of this application may be implemented through hardware, firmware, or a combination thereof. When the embodiments of this application are implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a computer. Examples of the computer readable medium include but are not limited to: a RAM, a ROM, an electrically erasable programmable read-only memory (EEPROM), a compact disc read-only memory (CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be properly defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio, and microwave, the coaxial cable, optical fiber/cable, twisted pair, DSL or wireless technologies such as infrared ray, radio, and microwave are included in fixation of a medium to which they belong. A disk (disk) and a disc (disc) that are used in the embodiments of this application include a compact disc (CD), a laser disc, an optical disc, a digital video disc (DVD), a floppy disk, and a Blu-ray disc. The disk usually magnetically copies data, and the disc optically copies data in a laser manner. The foregoing combination should also be included in the protection scope of the computer-readable medium.

In summary, what is described above is merely non-limiting example embodiments of this application, but is not intended to limit the protection scope, which is intended to cover any modification, equivalent replacement, or improvement made based on the disclosure of this application. The claims shall define the protection scope.

What is claimed is:

1. An operator network switching method performed by an electronic device, wherein the electronic device stores a first profile and a second profile, the first profile is a currently activated profile, and the method comprises:
   accessing, by the electronic device, a first operator network based on the first profile;
   detecting, by the electronic device, a first operation for disconnecting a network connection;
   disconnecting, by the electronic device, a connection to the first operator network in response to the first operation;
   detecting, by the electronic device, a second operation for restoring a network connection;
   searching, by the electronic device, for a network based on the first profile and the second profile in response to the second operation, to obtain a network search result corresponding to the first profile and a network search result corresponding to the second profile; and
   activating, by the electronic device, the second profile based on the network search result corresponding to the first profile and the network search result corresponding to the second profile, and accessing a second operator network based on the second profile,
   wherein the method further comprises:
   sending, by the electronic device to the first operator network, a request to stop charging for a service package corresponding to the first profile;
   receiving, by the electronic device, a second response for stopping charging for the service package corresponding to the first profile; and
   upon determining that the second response indicates that stopping of charging for the service package corresponding to the first profile succeeds, notifying a user that the first operator network stops charging for the service package corresponding to the first profile,
   wherein the second response is returned upon receipt of the request to stop charging for the service package corresponding to the first profile, and
   wherein the sending, by the electronic device to the first operator network, a request to stop charging for a service package corresponding to the first profile comprises:
   upon determining that a validity period of a service package corresponding to the second profile is longer than or equal to a first duration, sending, by the electronic device to the first operator network, the request to stop charging for the service package corresponding to the first profile.

2. The operator network switching method according to claim 1, further comprising:
   sending, by the electronic device, a request to subscribe to a call transfer service to the first operator network, wherein the request to subscribe to the call transfer service requests to transfer an incoming call for a first telephone number to a second telephone number, the first telephone number is a telephone number comprised in the first profile, and the second telephone number is a telephone number comprised in the second profile; and
   notifying, by the electronic device, a user that an incoming call for the first telephone number is to be transferred to the second telephone number when receiving a first response for subscribing to the call transfer service, wherein
   the first response indicates that the call transfer service is successfully subscribed to, and the first response is returned for the request to subscribe to the call transfer service.

3. The operator network switching method according to claim 1, wherein after the activating, by the electronic device, the second profile, the method further comprises:
   notifying, by the electronic device, a user of a service package corresponding to the second profile.

4. The operator network switching method according to claim 1, wherein the method further comprises:
deactivating, by the electronic device, the first profile.

5. The operator network switching method according to claim 1, wherein the searching for a network based on the first profile and the second profile, to obtain a network search result corresponding to the first profile and a network search result corresponding to the second profile comprises:
searching for a network based on the first profile, the second profile, and a radio frequency capability of the electronic device, to obtain the network search result corresponding to the first profile and the network search result corresponding to the second profile.

6. The operator network switching method according to claim 1, wherein the searching, by the electronic device, for a network based on the first profile and the second profile in response to the second operation, to obtain a network search result corresponding to the first profile and a network search result corresponding to the second profile comprises:
obtaining, by the electronic device, a first geographic location in response to the second operation, wherein the first geographic location indicates a current geographic location of a user;
determining, by the electronic device, whether a distance between the first geographic location and a second geographic location is greater than or equal to a first threshold, wherein the second geographic location is obtained before the electronic device disconnects a connection to the first operator network in response to the first operation; and
upon determining that the distance between the first geographic location and the second geographic location is greater than or equal to the first threshold, searching, by the electronic device, for a network based on the first profile and the second profile, to obtain the network search result corresponding to the first profile and the network search result corresponding to the second profile.

7. The operator network switching method according to claim 6, further comprising:
upon determining that the distance between the first geographic location and the second geographic location is less than the first threshold and greater than or equal to a second threshold, searching, by the electronic device, for a network based on the first profile, to obtain a first public land mobile network (PLMN), wherein the first threshold is greater than the second threshold;
determining, by the electronic device, whether the first PLMN is the same as a second PLMN, wherein the second PLMN is used when the electronic device accesses the first operator network; and
upon determining that the first PLMN is different from the second PLMN, searching, by the electronic device, for a network based on the first profile and the second profile, to obtain the network search result corresponding to the first profile and the network search result corresponding to the second profile.

8. The operator network switching method according to claim 1, wherein the searching, by the electronic device, for a network based on the first profile and the second profile in response to the second operation, to obtain a network search result corresponding to the first profile and a network search result corresponding to the second profile comprises:
searching, by the electronic device, for a network based on the first profile in response to the second operation, to obtain a first PLMN;
determining, by the electronic device, whether the first PLMN is the same as a second PLMN, wherein the second PLMN is a PLMN used when the electronic device accesses the first operator network; and
upon determining that the first PLMN is different from the second PLMN, searching, by the electronic device, for a network based on the first profile and the second profile, to obtain the network search result corresponding to the first profile and the network search result corresponding to the second profile.

9. The operator network switching method according to claim 1, wherein the activating, by the electronic device, the second profile based on the network search result corresponding to the first profile and the network search result corresponding to the second profile comprises:
activating, by the electronic device, the second profile based on the network search result corresponding to the first profile, the network search result corresponding to the second profile, service package information corresponding to the first profile, and service package information corresponding to the second profile; and/or
activating, by the electronic device, the second profile based on the network search result corresponding to the first profile, the network search result corresponding to the second profile, and a preconfigured network blacklist.

10. The operator network switching method according to claim 1, wherein the first operation is an operation of enabling an airplane mode, and the second operation is an operation of disabling the airplane mode; or the first operation is a power-off operation, and the second operation is a power-on operation.

11. An electronic device, comprising at least one processor, a memory, a display, and a camera, wherein the at least one processor is coupled to the memory, the display, and the camera;
the memory is configured to store program instructions that, when executed by the at least one processor, cause the electronic device to perform operations comprising:
accessing a first operator network based on a first profile;
detecting a first operation for disconnecting a network connection;
disconnecting a connection to the first operator network in response to the first operation;
detecting a second operation for restoring a network connection;
searching for a network based on the first profile and a second profile in response to the second operation, to obtain a network search result corresponding to the first profile and a network search result corresponding to the second profile;
activating the second profile based on the network search result corresponding to the first profile and the network search result corresponding to the second profile; and
accessing a second operator network based on the second profile,
wherein the operations further comprise:
sending, to the first operator network, a request to stop charging for a service package corresponding to the first profile;
receiving a second response for stopping charging for the service package corresponding to the first profile; and
upon determining that the second response indicates that stopping of charging for the service package corresponding to the first profile succeeds, notifying a user that the first operator network stops charging for the service package corresponding to the first profile, wherein the second response is returned upon receipt of the request to stop charging for the service package corresponding to the first profile, and wherein the sending, to the first operator network, a request to stop charging for a service package corresponding to the first profile comprises:

upon determining that a validity period of a service package corresponding to the second profile is longer than or equal to a first duration, sending, to the first operator network, the request to stop charging for the service package corresponding to the first profile.

12. An operator network switching method performed by an electronic device, wherein the electronic device stores a first profile and a second profile, the first profile is a currently activated profile, and the method comprises:

accessing, by the electronic device, a first operator network based on the first profile;

detecting, by the electronic device, a first operation for disconnecting a network connection;

disconnecting, by the electronic device, a connection to the first operator network in response to the first operation;

detecting, by the electronic device, a second operation for restoring a network connection;

obtaining, by the electronic device, a first geographic location in response to the second operation, wherein the first geographic location indicates a current geographic location of a user;

determining, by the electronic device, whether a distance between the first geographic location and a second geographic location is greater than or equal to a first threshold, wherein the second geographic location is obtained before the electronic device disconnects a connection to the first operator network in response to the first operation;

upon determining the distance between the first geographic location and the second geographic location is greater than or equal to the first threshold, activating, by the electronic device, the second profile, and accessing a second operator network based on the second profile, upon determining that the distance between the first geographic location and the second geographic location is less than the first threshold and greater than or equal to a second threshold, searching, by the electronic device, for a network based on the first profile, to obtain a first public land mobile network (PLMN), wherein the first threshold is greater than the second threshold;

determining, by the electronic device, whether the first PLMN is the same as a second PLMN, wherein the second PLMN is used when the electronic device accesses the first operator network; and upon determining that the first PLMN is different from the second PLMN, searching, by the electronic device, for a network based on the first profile and the second profile, to obtain a network search result corresponding to the first profile and a network search result corresponding to the second profile.

13. The operator network switching method according to claim 12, wherein the electronic device further stores a third profile; and the activating, by the electronic device, the second profile upon determining that the distance between the first geographic location and a second geographic location is greater than or equal to a first threshold comprises:

upon determining that the distance between the first geographic location and the second geographic location is greater than or equal to the first threshold, searching, by the electronic device, for a network based on the second profile and the third profile, to obtain the network search result corresponding to the second profile and a network search result corresponding to the third profile;

selecting, by the electronic device, the second profile for activation based on the network search result corresponding to the second profile and the network search result corresponding to the third profile; and activating, by the electronic device, the second profile.

14. The operator network switching method according to claim 13, wherein the selecting, by the electronic device, the second profile for activation based on the network search result corresponding to the second profile and the network search result corresponding to the third profile comprises:

determining, by the electronic device, a first score for the second profile based on the network search result corresponding to the second profile;

determining, by the electronic device, a second score for the third profile based on the network search result corresponding to the third profile;

selecting, by the electronic device, the second profile for activation based on the first score and the second score; and activating, by the electronic device, the second profile.

15. The operator network switching method according to claim 14, wherein the first score is larger than the second score.

16. An electronic device, comprising at least one processor, a memory, a display, and a camera, wherein the at least one processor is coupled to the memory, the display, and the camera;

the memory is configured to store program instructions that, when executed by the at least one processor, cause the electronic device to perform operations comprising:

accessing a first operator network based on a first profile;

detecting a first operation for disconnecting a network connection;

disconnecting a connection to the first operator network in response to the first operation;

detecting a second operation for restoring a network connection;

obtaining a first geographic location in response to the second operation, wherein the first geographic location indicates a current geographic location of a user;

determining whether a distance between the first geographic location and a second geographic location is greater than or equal to a first threshold, wherein the second geographic location is obtained before the electronic device disconnects a connection to the first operator network in response to the first operation; and upon determining that the distance between the first geographic location and the second geographic location is greater than or equal to the first threshold, activating a second profile, and accessing a second operator network based on the second profile, upon determining that the distance between the first geographic location and the second geographic location is less than the first threshold and greater than or equal to a second threshold, searching, by the electronic device, for a network based on the first profile, to obtain a first public land mobile network (PLMN), wherein the first threshold is greater than the second threshold;

determining, by the electronic device, whether the first PLMN is the same as a second PLMN, wherein the second PLMN is used when the electronic device accesses the first operator network; and upon determining that the first PLMN is different from the second PLMN, searching, by the electronic device, for a network based on the first profile and the second profile, to obtain a network search result corresponding to the first profile and a network search result corresponding to the second profile.

\* \* \* \* \*